(12) United States Patent
Mamak et al.

(10) Patent No.: US 8,853,314 B2
(45) Date of Patent: Oct. 7, 2014

(54) HEAT ABSORBING ADDITIVES

(75) Inventors: Marc Mamak, Mason, OH (US); Urs Lehmann, Basel (CH); Ralf Knischka, Neustadt (DE); Francesca Peri, Bologna (IT); Adolf Käser, Bottmingen (CH)

(73) Assignee: Datalase Ltd. (GB)

( * ) Notice: Subject to any disclaimer, the term of this patent is extended or adjusted under 35 U.S.C. 154(b) by 437 days.

(21) Appl. No.: 13/122,563

(22) PCT Filed: Oct. 14, 2009

(86) PCT No.: PCT/EP2009/063377
§ 371 (c)(1),
(2), (4) Date: Jul. 21, 2011

(87) PCT Pub. No.: WO2010/046285
PCT Pub. Date: Apr. 29, 2010

(65) Prior Publication Data
US 2012/0129090 A1 May 24, 2012

Related U.S. Application Data

(60) Provisional application No. 61/197,102, filed on Oct. 23, 2008.

(30) Foreign Application Priority Data

Feb. 2, 2009  (EP) ..................... 09151848

(51) Int. Cl.
C08K 3/10 (2006.01)
B82Y 30/00 (2011.01)
C01G 41/00 (2006.01)
C09D 5/32 (2006.01)
C01G 41/04 (2006.01)
C09D 7/12 (2006.01)
C22C 29/12 (2006.01)
C01G 41/02 (2006.01)
C09C 1/00 (2006.01)

(52) U.S. Cl.
CPC ............... *C01G 41/00* (2013.01); *B82Y 30/00* (2013.01); *B22F 2999/00* (2013.01); *C09D 5/32* (2013.01); *C01G 41/04* (2013.01); *C01P 2002/72* (2013.01); *C09D 7/1216* (2013.01); *C01P 2006/60* (2013.01); *C01P 2004/64* (2013.01); *C01P 2004/62* (2013.01); *C22C 29/12* (2013.01); *C01P 2002/82* (2013.01); *C01G 41/02* (2013.01); *C09D 7/1275* (2013.01); *C09C 1/00* (2013.01); *C09D 7/1266* (2013.01)
USPC .......................................... 524/413; 524/406

(58) Field of Classification Search
USPC ....................................................... 524/413
See application file for complete search history.

(56) References Cited

U.S. PATENT DOCUMENTS

| 2,357,725 A | 9/1944 | Bennett |
| 2,427,443 A | 9/1947 | Cochran |
| 2,800,457 A | 7/1957 | Green et al. |
| 3,373,170 A | 3/1968 | Jones |
| 3,513,114 A | 5/1970 | Hahn et al. |
| 3,778,383 A | 12/1973 | Schibler et al. |
| 3,853,791 A | 12/1974 | Feins |
| 3,955,987 A | 5/1976 | Schaar et al. |
| 3,959,571 A | 5/1976 | Yahagi et al. |
| 4,166,811 A | 9/1979 | Marr et al. |
| 4,237,212 A | 12/1980 | Inoue et al. |
| 4,241,144 A | 12/1980 | Hendy |
| 4,325,863 A | 4/1982 | Hinsken et al. |
| 4,338,244 A | 7/1982 | Hinsken et al. |
| 4,619,956 A | 10/1986 | Susi |
| 4,916,247 A | 4/1990 | Steinnmann et al. |
| 5,035,983 A | 7/1991 | Kiyonari et al. |
| 5,063,137 A | 11/1991 | Kiyonari et al. |
| 5,166,350 A | 11/1992 | Bedekovic et al. |
| 5,175,312 A | 12/1992 | Dubs et al. |
| 5,198,498 A | 3/1993 | Valet et al. |
| 5,216,052 A | 6/1993 | Nesvadba et al. |
| 5,252,643 A | 10/1993 | Nesvadba |
| 5,256,805 A | 10/1993 | O'Lenick et al. |
| 5,298,067 A | 3/1994 | Valet et al. |

(Continued)

FOREIGN PATENT DOCUMENTS

CA 2042858 11/1991
DE 2130845 1/1972

(Continued)

OTHER PUBLICATIONS

Specification sheet for Texicryl S-02 acquired from http://www.scottbader.com/downloads/UK_PDF_Datasheet_Files/Graphic_Arts/Texicryl%20S-02.pdf on Nov. 2, 2012.
"Dilute Ammonium Hydroxide" acquired from http://www51.honeywell.com/sm/em/common/documents/2.6_usa_msds_81.pdf on Nov. 28, 2011.
"Texicryl 13-567" acquired from http://www.scottbader.com/downloads/UK_PDF_Datasheet_Files/Graphic_Arts/13-567.pdf on Nov. 28, 2011.

(Continued)

*Primary Examiner* — Hui Chin
(74) *Attorney, Agent, or Firm* — Stoel Rives LLP

(57) ABSTRACT

The invention relates to a powder composition comprising particles of a) an alkali metal tungsten bronze, b) tungsten oxide, and c) tungsten metal, a method for the preparation of said powder composition, and to the use of said powder composition in form of a dispersion in a polymer material or article for heat shielding, or to increase the heat-input amount of near infrared radiation in processes selected from laser welding of plastics, NIR curing of coatings, drying of printing inks, fixing of ink toners to a substrate, heating of plastic performs, laser marking of plastics or paper.

15 Claims, 3 Drawing Sheets

(56) References Cited

U.S. PATENT DOCUMENTS

| | | |
|---|---|---|
| 5,322,868 A | 6/1994 | Valet et al. |
| 5,358,821 A | 10/1994 | Bertrand et al. |
| 5,369,140 A | 11/1994 | Valet et al. |
| 5,413,629 A | 5/1995 | Yasui et al. |
| 5,560,769 A | 10/1996 | Conner et al. |
| 5,810,915 A | 9/1998 | Nagai et al. |
| 5,897,938 A | 4/1999 | Shinmoto et al. |
| 5,948,836 A | 9/1999 | Bonora |
| 6,057,380 A | 5/2000 | Birbaum et al. |
| 6,143,904 A | 11/2000 | Zink et al. |
| 6,210,472 B1 | 4/2001 | Kwan et al. |
| 6,261,348 B1 | 7/2001 | Kwan et al. |
| 6,394,594 B1 | 5/2002 | Katsurgai et al. |
| 6,425,947 B1 | 7/2002 | Berlin et al. |
| 6,478,861 B1 | 11/2002 | Kwan et al. |
| 6,888,095 B2 | 5/2005 | Khan |
| 7,144,676 B2 | 12/2006 | Barr et al. |
| 7,202,288 B2 | 4/2007 | Kniess et al. |
| 7,270,919 B2 | 9/2007 | Stubbs |
| 7,410,744 B2 | 8/2008 | Watanabe et al. |
| 7,485,403 B2 | 2/2009 | Khan |
| 7,635,662 B2 | 12/2009 | Kabashima et al. |
| 7,708,974 B2* | 5/2010 | Yadav ............... 423/594.13 |
| 7,998,653 B2 | 8/2011 | O'Donoghue et al. |
| 8,083,847 B2 | 12/2011 | Takeda et al. |
| 8,101,545 B2 | 1/2012 | Campbell et al. |
| 8,461,075 B2 | 6/2013 | Watanabe et al. |
| 2001/0044553 A1 | 11/2001 | Kabashima et al. |
| 2003/0180660 A1 | 9/2003 | Khan |
| 2003/0186001 A1 | 10/2003 | Khan |
| 2003/0191223 A1 | 10/2003 | Waterkamp et al. |
| 2004/0110870 A1 | 6/2004 | Liu |
| 2004/0157975 A1 | 8/2004 | Kniess et al. |
| 2005/0148467 A1 | 7/2005 | Makitalo et al. |
| 2005/0158548 A1 | 7/2005 | Senga |
| 2006/0040217 A1 | 2/2006 | Stubbs |
| 2006/0178254 A1* | 8/2006 | Takeda et al. ............... 501/1 |
| 2007/0054220 A1 | 3/2007 | Heneghan |
| 2007/0128542 A1 | 6/2007 | Watanabe et al. |
| 2007/0187653 A1 | 8/2007 | Takeda et al. |
| 2008/0113861 A1 | 5/2008 | Watanabe et al. |
| 2008/0308775 A1* | 12/2008 | Yabuki ............... 252/587 |
| 2009/0071367 A1 | 3/2009 | Campbell et al. |
| 2009/0214835 A1 | 8/2009 | Campbell et al. |
| 2009/0220749 A1 | 9/2009 | O'Donoghue et al. |
| 2010/0021833 A1* | 1/2010 | Lehmann et al. ............... 430/31 |
| 2010/0233447 A1 | 9/2010 | Campbell et al. |
| 2010/0239642 A1 | 9/2010 | Campbell et al. |
| 2011/0148092 A1 | 6/2011 | Jarvis et al. |
| 2011/0274893 A1 | 11/2011 | Kaser et al. |

FOREIGN PATENT DOCUMENTS

| | | |
|---|---|---|
| DE | 2914427 | 10/1980 |
| DE | 4316611 | 11/1993 |
| DE | 4316622 | 11/1993 |
| DE | 4316876 | 11/1993 |
| DE | 4338361 | 5/1995 |
| EP | 0187329 | 7/1986 |
| EP | 434608 | 6/1991 |
| EP | 458502 | 11/1991 |
| EP | 0546577 | 6/1993 |
| EP | 0589839 | 3/1994 |
| EP | 0591102 | 4/1994 |
| EP | 0600441 | 6/1994 |
| EP | 0690094 | 1/1996 |
| EP | 0704437 | 4/1996 |
| EP | 0796742 | 9/1997 |
| EP | 0812888 | 12/1997 |
| EP | 0980028 | 2/2000 |
| EP | 1291384 | 3/2003 |
| EP | 1676890 | 7/2006 |
| EP | 1859674 | 11/2007 |
| EP | 1847635 | 9/2010 |
| GB | 989264 | 4/1965 |
| GB | 1347467 | 2/1974 |
| GB | 1355124 | 5/1974 |
| GB | 1389716 | 4/1975 |
| GB | 2002801 | 2/1979 |
| GB | 1548059 | 7/1979 |
| GB | 2154597 | 9/1985 |
| GB | 2206419 | 1/1989 |
| GB | 2297091 | 7/1996 |
| JP | 03-76873 | 4/1991 |
| JP | 08073223 | 3/1996 |
| JP | 11-67604 | 3/1999 |
| JP | 2006-111675 | 4/2006 |
| JP | 2006-132042 | 5/2006 |
| JP | 2006154516 | 6/2006 |
| WO | WO-94/18278 | 8/1994 |
| WO | WO-96/23659 | 8/1996 |
| WO | WO-96/28431 | 9/1996 |
| WO | WO-98/56852 | 12/1998 |
| WO | WO-98/56853 | 12/1998 |
| WO | WO-00/61377 | 10/2000 |
| WO | WO-02/068205 | 9/2002 |
| WO | WO-02/068207 | 9/2002 |
| WO | WO-02/074548 | 9/2002 |
| WO | WO-02/100914 | 12/2002 |
| WO | WO-2004/043704 | 5/2004 |
| WO | WO-2005/012442 | 2/2005 |
| WO | WO-2005/037932 | 4/2005 |
| WO | WO-2005/068207 | 7/2005 |
| WO | WO-2006/051309 | 5/2006 |
| WO | WO-2006/063165 | 6/2006 |
| WO | WO-2006/064193 | 6/2006 |
| WO | WO-2006/067073 | 6/2006 |
| WO | WO-2006/068205 | 6/2006 |
| WO | WO-2006/108745 | 10/2006 |
| WO | WO-2006/129078 | 12/2006 |
| WO | WO-2007/012578 | 2/2007 |
| WO | WO-2007/031454 | 3/2007 |
| WO | WO-2007/088104 | 8/2007 |
| WO | WO-2007/092030 | 8/2007 |
| WO | WO-2008/083912 | 7/2008 |
| WO | WO-2009/010393 | 1/2009 |
| WO | WO-2009/010405 | 1/2009 |
| WO | WO-2009-059901 | 5/2009 |
| WO | WO-2010/046285 | 4/2010 |
| WO | WO-2010/049282 | 5/2010 |

OTHER PUBLICATIONS

Derwent AN 1999-238901[20] of JP 11-67604.
Derwent AN 1990-241627[32] of JP 03-76873.
Preliminary Amendment filed Sep. 11, 2007 in related U.S. Appl. No. 11/886,137.
First Office Action issued May 9, 2011 in related U.S. Appl. No. 11/886,137.
Response to the May 9, 2011 Office Action issued Aug. 3, 2011 in related U.S. Appl. No. 11/886,137.
Notice of Allowance issued Sep. 30, 2011 in related U.S. Appl. No. 11/886,137.
International Search Report and Written Opinion issued May 29, 2006 in International Application No. PCT/EP2006/060658.
International Preliminary Report on Patentability issued Sep. 25, 2007 in International Application No. PCT/EP2006/060658.
International Search Report and Written Opinion issued Oct. 30, 2006 in International Application No. PCT/EP2006/064299.
International Preliminary Report on Patentability issued Nov. 27, 2008 in International Application No. PCT/EP2006/064299.
Preliminary Amendment filed Jan. 12, 201 in related U.S. Appl. No. 12/668,666.
First Office Action issued Dec. 11, 2012 in related U.S. Appl. No. 12/668,666.
Response to the Dec. 11, 2012 Office Action filed Jun. 11, 2013 in related U.S. Appl. No. 12/668,666.
Final Office Action issued Aug. 22, 2013 in related U.S. Appl. No. 12/668,666.
International Search Report and Written Opinion issued Sep. 11, 2008 in International Application No. PCT/EP2008/058547.

(56) References Cited

OTHER PUBLICATIONS

International Preliminary Report on Patentability issued Jan. 19, 2010 in International Application No. PCT/EP2008/058547.
Preliminary Amendment filed Jan. 12, 2010 in related U.S. Appl. No. 12/668,669.
First Office Action issued Jul. 11, 2012 in related U.S. Appl. No. 12/668,669.
Response to the Jul. 11, 2012 Office Action filed Oct. 16, 2012 in related U.S. Appl. No. 12/668,669.
Second Office Action issued Jan. 18, 2013 in related U.S. Appl. No. 12/668,669.
Response to the Jan. 18, 2013 Office Action filed Jul. 9, 2013 in related U.S. Appl. No. 12/668,669.
International Search Report and Written Opinion issued Oct. 28, 2008 in International Application No. PCT/EP2008/058637.
International Preliminary Report on Patentability issued Jan. 19, 2010 in International Application No. PCT/EP2008/058637.
Preliminary Amendment filed Apr. 11, 2011 in related U.S. Appl. No. 13/123,603.
International Search Report and Written Opinion issued Jan. 25, 2010 in International Application No. PCT/EP2009/063521.
International Preliminary Report on Patentability issued May 3, 2011 in International Application No. PCT/EP2009/063521.
International Preliminary Report on Patentability issued Apr. 26, 2011 in International Application No. PCT/EP2009/063377.
Preliminary Amendment filed Mar. 10, 2008 in related U.S. Appl. No. 11/991,762.
First Office Action issued Sep. 30, 2010 in related U.S. Appl. No. 11/991,762.
Response to the Sep. 30, 2010 Office Action filed Jan. 26, 2011 in related U.S. Appl. No. 11/991,762.
Notice of Allowance issued Apr. 5, 2011 in related U.S. Appl. No. 11/991,762.
Preliminary Amendment filed Jan. 22, 2008 in related U.S. Appl. No. 11/989,167.
First Office Action issued Dec. 1, 2011 in related U.S. Appl. No. 11/989,167.
Response to the Dec. 1, 2011 Office Action filed Mar. 16, 2012 in related U.S. Appl. No. 11/989,167.
Second Office Action issued Apr. 30, 2012 in related U.S. Appl. No. 11/989,167.
Response to the Apr. 30, 2012 Office Action filed Sep. 27, 2012 in related U.S. Appl. No. 11/989,167.
Final Office Action issued Nov. 8, 2012 in related U.S. Appl. No. 11/989,167.
Response to the Nov. 8, 2012 Office Action filed Apr. 8, 2013 in related U.S. Appl. No. 11/989,167.
Notice of Allowance issued Apr. 19, 2013 in related U.S. Appl. No. 11/989,167.
Notification of Transmittal of the International Search Report of the International Searching Authority mailed May 11, 2010 in International Application No. PCT/EP2009/063377.
Notice to File Corrected Application Papers issued on Nov. 7, 2013 in U.S. Appl. No. 11/989,167.
Amendment to the Specification After Allowance filed Dec. 6, 2013 in U.S. Appl. No. 11/989,167.
Office Action issued Jan. 9, 2014 in U.S. Appl. No. 11/989,167.
Petition to Correct Assignee Information and for Corrected Patent filed Mar. 25, 2014 in U.S. Appl. No. 11/989,167.
Decision on the Petition issued Apr. 1, 2014 in U.S. Appl. No. 11/989,167.
Renewed Petition filed Apr. 17, 2014 in U.S. Appl. No. 11/989,167.
Response to the Aug. 22, 2013 Office Action filed Nov. 22, 2013 in related U.S. Appl. No. 12/668,666.
Office Action issued Dec. 16, 2013 in related U.S. Appl. No. 12/668,666.

* cited by examiner

HEAT ABSORBING ADDITIVES

This application is a 371 of PCT/EP2009/063377, filed Oct. 14, 2009, which claims priority of U.S. app. No. 61/197,102, filed Oct. 23, 2008, the contents of which are hereby incorporated by reference.

The present application pertains to certain particles of the tungsten/tungsten oxide series, a method for their preparation, compositions containing these particles, and the use of the particles as IR absorbers and/or heat shielding additives.

A number of metal oxides including certain tungstates have long been known to combine electric conductivity with IR absorbing properties. Certain materials have now been found which exhibit a distinctly higher effect than other known IR absorbers although absorbing the same amount of energy. These tungsten bronzes, e.g. when incorporated into a coating, lead to a higher temperature increase upon IR irradiation than expected according to their spectral absorption capacity. In one application field, the temperature increase is distinctly higher than found with other known IR absorbers and reaches almost the temperature observed with carbon black. In another application field, i.e. laser marking of paper, the present tungsten bronzes/suboxides surprisingly prove to be at least 10 times more efficient than Lathanumhexaboride, an well known almost colourless IR absorber.

Many technical processes (like laser welding and marking of plastics, NIR curing and drying of coatings, drying of printings, laser marking of paper, curing and drying of adhesives, fixing of ink toners to a substrate, heating of plastic preforms etc.) require an efficient, quick and focused local heat-input through IR radiation. The conversion of IR radiation into heat is realized by placing appropriate IR absorbers at the place where the heat is required. Carbon black is a well known efficient IR absorber for such processes. But carbon black has one big draw back: that's its strong black colour. Thus carbon black cannot be applied for coloured (other than black or grey), uncoloured, white or transparent systems. For such systems a "white or colourless carbon black" is a great technical need. Accordingly, one of the problems underlying the present invention is to find such a "colourless and transparent carbon black".

Very surprisingly the tungsten oxide material of the present invention comes quite near to this target profile—although it is slightly bluish. Due to its surprisingly high efficiency of conversion of IR radiation into heat, the present tungsten material can be applied at such a low concentration that its own colour is acceptable for most applications. The same is true for transparency: the material (plastics, coatings) containing this tungsten oxide remains also highly transparent.

While these materials function as absorbers for infrared radiation, their presence in a material, which usually is transparent for IR, may lead to partial or complete blocking of this radiation and thus provide a heat shielding effect.

Tungsten oxide powders, (e.g. $WO_{2.72}$) are commercially available as fine powders (5-20 microns) e.g. from Osram Sylvania.

Tungsten oxides and tungstates are known as infrared shielding material. The publications EP 1 676 890 and US2007/0187653 (Sumitomo Metal Mining Company) disclose an infrared shielding nanoparticle dispersion comprising tungsten trioxide having reduced oxygen.

The preparation of some tungstates is described in EP 1 676 890, US2007/0187653, WO07/092,030.

The present invention pertains to a powder composition comprising
a) an alkali metal tungsten bronze,
b) a binary tungsten oxide (i.e. phase consisting essentially of the elements W and O), and
c) tungsten metal.

Alkali metal tungsten bronzes of present component (a) generally conform to the formula

$WO_{3-z}Me_x$, where Me is selected from Rb, Li, and especially Na, K, Cs; x ranges from 0.2 to 1; and z is 0, or ranges from 0 to x.

The binary tungsten oxide in the present composition in its overall composition usually conforms to the formula $WO_{3-y}$, where y ranges from 0 to 1, for example from 0.01 to 0.55, preferably from 0 to 0.33, especially from 0 to 0.1. Examples of such binary tungsten oxides are widely known, examples are the phases $WO_3$, $WO_{2.92}$ (also known as $W_{25}O_{73}$), $WO_{2.83}$ (i.e. $W_{24}O_{68}$), $WO_{2.8}$ (i.e. $W_5O_{14}$), $WO_{2.72}$ (i.e. $W_{18}O_{49}$), $WO_{2.625}$ (i.e. $W_{32}O_{84}$), $WO_2$.

Most preferred binary tungsten oxide, often formed in the process as described further below, is the trioxide (corresponding to the above formula wherein y=0), in any of its modifications (especially the monoclinic and triclinic explained below), or combinations of said trioxide with minor amounts (e.g. up to 20% b.w.) of a suboxide (wherein y>0).

Some further preferred binary tungsten oxide phases include:
$WO_3$ in its monoclinic form, $P2_1/n$;
$WO_3$ in its triclinic form, $P-1$;
$WO_{2.92}$ in its monoclinic form, $P2_1/c$;
$WO_{2.8}$ in its tetragonal form, $P\,42m$;
$WO_{2.72}$ in its monoclinic form, $P2/m$;
$WO_{2.625}$ in its orthorhombic form, $P\,b\,a\,m$.

Typical compositions of the invention contain
a) 25-95 parts by weight, especially 40-94 parts by weight, of an alkali metal tungsten bronze of the formula $WO_{3-z}Me_x$, where Me is selected from Cs, Na, K; x ranges from 0.2 to 1, especially from 0.4 to 0.7; and z is 0, or ranges from 0 to x,
b) 4-60 parts by weight, especially 5-60 parts by weight, of the binary tungsten oxide, and
c) 1-15 parts by weight, especially 1-10 parts by weight, of tungsten metal.

The particle composition of the invention may comprise components a-c each as separate particles or, preferably, the majority of particles, or all of them, are containing each of these components. Components a-c, each typically in crystalline form (as characterized in the present examples), together usually make up the major part of the present powder material, often about 95-100% b.w. of the total powder composition; the remainders, if any, usually are other tungsten compounds and/or alkaline compounds including amorphous material, organic polymers, and/or water. The (primary) particles are usually nanoparticles from the size range 1 nm to 800 nm, e.g. 90% b.w. of the particles are within that range, especially within the diameter range 5 to 300 nm; aggregates, if formed, e.g. in a dispersion, usually may be converted into primary particles, e.g. dispersions thereof, by well known techniques. Preferred powders are those wherein at least 80% b.w. of the particles have their smallest and their largest diameters from the range 5 to 300 nm. The particles embedded in their matrix are able to absorb relevant IR radiation (especially NIR, e.g. in the band from 800 to 2500 nm). The shape may be freely selected, e.g. from spheres, flakes and nanorods.

A preferred class of powders contain the bronze (a) as mayor component making up at least 50% b.w., especially at least 70% b.w., of the total particle mixture. Such powders may contain lower amounts of component (b), e.g. comprising, on 100 parts b.w. of the total particle mixture,
a) 70-98 parts by weight, especially 80-96 parts by weight, of the alkali metal tungsten bronze of the formula $WO_{3-z}Me_x$, where Me is selected from Cs, Na, K; x ranges from 0.2 to 1; and z is 0, or ranges from 0 to x,
b) 1-15 parts by weight, especially 2-10 parts by weight, of the binary tungsten oxide, and
c) 1-15 parts by weight, especially 2-10 parts by weight, of tungsten metal.

Component (a) is most preferably consisting essentially of one or more cubic, hexagonal and/or tetragonal crystalline phases, especially of space groups Pm3m, Fd3m, $P6_322$, $P6_3/mcm$, P4/mbm.

The invention further pertains to a process for the preparation of an alkali metal tungsten bronze or alkali metal tungsten bronze composition, especially as defined above, which process comprises contacting a mixture of a suitable tungsten educt and a suitable alkali salt with a reducing gas at a temperature of 2500 K or more.

Alkali is usually understood to comprise cesium, rubidium, potassium, sodium, lithium; preferred are Cs, Rb, K, Na, especially Cs, K, Na. These elements generally are introduced into the present compositions in the form of salts which may be freely mixed with the tungsten precursor and begins decomposition at low temperature (e.g. below 1000° C.). These salts may include acetates, formates, nitrates, hydrogencarbonates, nitrites, chlorides, bromides, iodides, sulfates, perchlorates, hypochlorite, hydroxides, propionates, pyruvates, oxalates, fumarates, lactates, methoxides, alkoxides, oxides, etc. Preferred are carbonates or hydrogencarbonates (such as $Na_2CO_3$, $K_2CO_3$, $Cs_2CO_3$, $NaHCO_3$, $KHCO_3$, $CsHCO_3$), acetates (especially Na-, K- or Cs-acetates such as NaOAc, KOAc, CsOAc where Ac stands for CO—$CH_3$), and citrates (especially Na-citrates, K-citrates, Cs-citrates, such as tri-potassium citrate monohydrate: $K_3C_6H_5O_7H_2O$). Such compositions may be used in hydrated or anhydrous form. One benefit of this approach is that the decomposition product formed from the anion of the alkali dopant is volatile (e.g. CO2, CO, CHx, NOx, H2O, Cl2, etc.), and therefore does not react to create a by-product in the final material.

A preferred process comprises contacting a mixture of an ammonium tungstate and alkali precursor compound with hydrogen at a temperature of 2500 K or more.

The tungsten educt generally may be freely chosen from tungsten materials reactive under plasma conditions, e.g. tungstates, tungsten oxides, tungsten metal. Preferred are materials with lower melting point, e.g. tungsten oxides or especially ammonium tungstates. Preferred ammonium tungstates for use in this process include ammonium monotungstate, ammonium paratungstates such as hexatungstate and dodekatungstate, and ammonium metatungstate, as well as their hydrates; an example is $(NH_4)_{10}W_{12}H_2O_{42} \cdot 4H_2O$.

Of course, using a suitable alkali metal tungstate, alone or in combination with one or more of the other educts mentioned, is possible as well. Examples are sodium tungsten oxide dihydrate (Na2WO4.2H2O) or sodium metatungstate (3Na2WO4.9WO3.H2O) to produce sodium tungsten bronzes. While the stoichiometry of Na to W may appear too high to form a bronze phase (typically x=0-1.2), sodium may preferentially vaporize in the plasma due to its low boiling point which may result in a final material which has much lower sodium content after thermal plasma processing. Alternatively, sodium tungsten oxide dihydrate (Na2WO4.2H2O) or similar may be added in stoichiometric amounts to ammonium paratungstate to prepare sodium doped bronzes.

Suitable gases for reduction and/or hydrogen release include, for example, ammonia, volatile hydrocarbons like ethane and propane, carbon monoxide; these may be used in place of hydrogen or as a mixture with hydrogen. The contacting is preferably effected in a plasma, especially where hydrogen and/or the reducing gas is used in mixture with a noble gas.

The plasma torch is preferably an induction plasma torch. The preferred induction plasma torches for use in the process of the present invention are available from Tekna Plasma Systems, Inc. of Sherbrooke, Quebec, Canada. Boulos et al., U.S. Pat. No. 5,200,595, is hereby incorporated by reference for its teachings relative to the construction and operation of plasma induction torches.

Educts are conveniently fed into the plasma in the form of a powder mixture. Preferred is molecular scale mixing. Especially using metal salts with low decomposition temperature results in materials of suitable homogeneity (due to the high plasma temperature and low decomposition temperature), at high throughput and efficiency while using lower cost precursors.

An alternative type of thermal plasma synthesis includes liquid spraying or suspension spraying. The procedure for liquid spraying may be as follows:
a) dissolve and/or disperse the tungsten precursor and alkali metal precursor in a solvent (water, alcohol, etc.), then
b) atomize or spray the soluble or dispersed (especially colloidal) precursors into the plasma.

Tungstic acid, ammonium tungstates, sodium tungstates, tungsten chloride, and tungsten alkoxides (e.g. tungsten isopropoxide, ethoxide, dichloride ethoxide) are examples of soluble tungsten educts. Acids or bases may be used to keep the precursors dissolved or in the colloidal state (Sol-gel chemistry). The products obtained by this approach may have a higher degree of homogeneity than those obtained after feeding solid precursors The present particle composition brings about the advantage of good dispersability in the polymer, good heat shielding properties of the polymer composition thus obtainable, and good transparency, low haze. The resulting polymer compositions generally show low discoloration and good colour stability upon aging (low yellowing).

The particles may be incorporated e.g. by an additive blending technique using a mixer, kneader or extruder, into coating or plastic compositions, e.g. thermoplastic polymer materials in form of films or sheets. The particles may be used to obtain transparent or translucent, especially transparent, materials having highly effective IR absorption/heat shielding properties, and/or to improve the heat absorption efficacy of the material.

The present powder compositions advantageously are used as an additive in the following polymer matrices:

1. Polymers of monoolefins and diolefins, for example polypropylene, polyisobutylene, polybut-1-ene, poly-4-methylpent-1-ene, polyvinylcyclohexane, polyisoprene or polybutadiene, as well as polymers of cycloolefins, for instance of cyclopentene or norbornene, polyethylene (which optionally can be crosslinked), for example high density polyethylene (HDPE), high density and high molecular weight polyethylene (HDPE-HMW), high density and ultra-high molecular weight polyethylene (HDPE-UHMW), medium density polyethylene (MDPE), low density polyethylene (LDPE), linear low density polyethylene (LLDPE), (VLDPE) and (U LDPE).

Polyolefins, i.e. the polymers of monoolefins exemplified in the preceding paragraph, preferably polyethylene and polypropylene, can be prepared by different, and especially by the following, methods:

a) radical polymerisation (normally under high pressure and at elevated temperature).

b) catalytic polymerisation using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either π- or σ-coordinated. These metal complexes may be in the free form or fixed on substrates, typically on activated magnesium chloride, titanium(III) chloride, alumina or silicon oxide. These catalysts may be soluble or insoluble in the polymerisation medium. The catalysts can be used by themselves in the polymerisation or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, amine or silyl ether groups. These catalyst systems are usually termed Phillips, Standard Oil Indiana, Ziegler (-Natta), TNZ (DuPont), metallocene or single site catalysts (SSC).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3. Copolymers of monoolefins and diolefins with each other or with other vinyl monomers, for example ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, ethylene/vinylcyclohexane copolymers, ethylene/cycloolefin copolymers (e.g. ethylene/norbornene like COC), ethylene/1-olefins copolymers, where the 1-olefin is gene-rated in-situ; propylene/butadiene copolymers, isobutylene/isoprene copolymers, ethylene/vinylcyclohexene copolymers, ethylene/alkyl acrylate copolymers, ethylene/alkyl methacrylate copolymers, ethylene/vinyl acetate copolymers or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethyllene-propylene copolymers, LDPE/ethylene-vinyl acetate copolymers (EVA), LDPE/ethylene-acrylic acid copolymers (EAA), LLDPE/EVA, LLDPE/EAA and alternating or random polyalkylene/carbon monoxide copolymers and mixtures thereof with other polymers, for example polyamides.

4. Hydrocarbon resins (for example $C_5$-$C_9$) including hydrogenated modifications thereof (e.g. tackifiers) and mixtures of polyalkylenes and starch.

Homopolymers and copolymers from 1.)-4.) may have any stereostructure including syndiotactic, isotactic, hemi-isotactic or atactic; where atactic polymers are preferred. Stereoblock polymers are also included.

5. Polystyrene, poly(p-methylstyrene), poly(α-methylstyrene).

6. Aromatic homopolymers and copolymers derived from vinyl aromatic monomers including styrene, α-methylstyrene, all isomers of vinyl toluene, especially p-vinyltoluene, all isomers of ethyl styrene, propyl styrene, vinyl biphenyl, vinyl naphthalene, and vinyl anthracene, and mixtures thereof. Homopolymers and copolymers may have any stereostructure including syndiotactic, isotactic, hemi-isotactic or atactic; where atactic polymers are preferred. Stepreoblock polymers are also included.

6a. Copolymers including aforementioned vinyl aromatic monomers and comonomers selected from ethylene, propylene, dienes, nitriles, acids, maleic anhydrides, maleimides, vinyl acetate and vinyl chloride or acrylic derivatives and mixtures thereof, for example styrene/butadiene, styrene/acrylonitrile, styrene/ethylene (interpolymers), styrene/alkyl methacrylate, styrene/butadiene/alkyl acrylate, styrene/butadiene/alkyl methacrylate, styrene/maleic anhydride, styrene/acrylonitrile/methyl acrylate; mixtures of high impact strength of styrene copolymers and another polymer, for example a polyacrylate, a diene polymer or an ethylene/propylene/diene terpolymer; and block copolymers of styrene such as styrene/butadiene/styrene, styrene/isoprene/styrene, styrene/ethylene/butylene/styrene or styrene/ethylene/propylene/styrene.

6b. Hydrogenated aromatic polymers derived from hydrogenation of polymers mentioned under 6.), especially including polycyclohexylethylene (PCHE) prepared by hydrogenating atactic polystyrene, often referred to as polyvinylcyclohexane (PVCH).

6c. Hydrogenated aromatic polymers derived from hydrogenation of polymers mentioned under 6a.).

Homopolymers and copolymers may have any stereostructure including syndiotactic, isotactic, hemi-isotactic or atactic; where atactic polymers are preferred. Stereoblock polymers are also included.

7. Graft copolymers of vinyl aromatic monomers such as styrene or α-methylstyrene, for example styrene on polybutadiene, styrene on polybutadiene-styrene or polybutadiene-acrylonitrile copolymers; styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene; styrene and alkyl acrylates or methacrylates on polybutadiene; styrene and acrylonitrile on ethylene/propylene/diene terpolymers; styrene and acrylonitrile on polyalkyl acrylates or polyalkyl methacrylates, styrene and acrylonitrile on acrylate/butadiene copolymers, as well as mixtures thereof with the copolymers listed under 6), for example the copolymer mixtures known as ABS, MBS, ASA or AES polymers.

8. Halogen-containing polymers such as polychloroprene, chlorinated rubbers, chlorinated and brominated copolymer of isobutylene-isoprene (halobutyl rubber), chlorinated or sulfochlorinated polyethylene, copolymers of ethylene and chlorinated ethylene, epichlorohydrin homo- and copolymers, especially polymers of halogen-containing vinyl compounds, for example polyvinyl chloride, polyvinylidene chloride, polyvinyl fluoride, polyvinylidene fluoride, as well as copolymers thereof such as vinyl chloride/vinylidene chloride, vinyl chloride/vinyl acetate or vinylidene chloride/vinyl acetate copolymers.

9. Polymers derived from α,β-unsaturated acids and derivatives thereof such as polyacrylates and polymethacrylates; polymethyl methacrylates, polyacrylamides and polyacrylonitriles, impact-modified with butyl acrylate.

10. Copolymers of the monomers mentioned under 9) with each other or with other unsaturated monomers, for example acrylonitrile/butadiene copolymers, acrylonitrile/alkyl acrylate copolymers, acrylonitrile/alkoxyalkyl acrylate or acrylonitrile/vinyl halide copolymers or acrylonitrile/alkyl methacrylate/butadiene terpolymers.

11. Polymers derived from unsaturated alcohols and amines or the acyl derivatives or acetals thereof, for example polyvinyl alcohol, polyvinyl acetate, polyvinyl stearate, polyvinyl benzoate, polyvinyl maleate, polyvinyl butyral, polyallyl phthalate or polyallyl melamine; as well as their copolymers with olefins mentioned in 1) above.

12. Homopolymers and copolymers of cyclic ethers such as polyalkylene glycols, polyethyllene oxide, polypropylene oxide or copolymers thereof with bisglycidyl ethers.

13. Polyacetals such as polyoxymethylene and those polyoxymethylenes which contain ethylene oxide as a comonomer; polyacetals modified with thermoplastic polyurethanes, acrylates or MBS.

14. Polyphenylene oxides and sulfides, and mixtures of polyphenylene oxides with styrene polymers or polyamides.

15. Polyurethanes derived from hydroxyl-terminated polyethers, polyesters or polybutadienes on the one hand and aliphatic or aromatic polyisocyanates on the other, as well as precursors thereof.

16. Polyamides and copolyamides derived from diamines and dicarboxylic acids and/or from aminocarboxylic acids or the corresponding lactams, for example polyamide 4, polyamide 6, polyamide 6/6, 6/10, 6/9, 6/12, 4/6, 12/12, polyamide 11, polyamide 12, aromatic polyamides starting from m-xylene diamine and adipic acid; polyamides prepared from hexamethylenediamine and isophthalic or/and terephthalic acid and with or without an elastomer as modifier, for example poly-2,4,4,-trimethylhexamethylene terephthalamide or poly-m-phenylene isophthalamide; and also block copolymers of the aforementioned polyamides with polyolefins, olefin copolymers, ionomers or chemically bonded or grafted elastomers; or with polyethers, e.g. with polyethylene glycol, polypropylene glycol or polytetramethylene glycol; as well as polyamides or copolyamides modified with EPDM or ABS; and polyamides condensed during processing (RIM polyamide systems).

17. Polyureas, polyimides, polyamide-imides, polyetherimides, polyesterimides, polyhydantoins and polybenzimidazoles.

18. Polyesters derived from dicarboxylic acids and diols and/or from hydroxycarboxylic acids or the corresponding lactones or lactides, for example polyethylene terephthalate, polybutylene terephthalate, poly-1,4-dimethylolcyclohexane terephthalate, polyalkylene naphthalate and polyhydroxybenzoates as well as copolyether esters derived from hydroxyl-terminated polyethers, and also polyesters modified with polycarbonates or MBS. Copolyesters may comprise, for example—but are not limited to—polybutylenesuccinate/terephtalate, polybutyleneadipate/terephthalate, polytetramethyleneadipate/terephthalate, polybutylensuccinate/adipate, polybutylensuccinate/carbonate, poly-3-hydroxybutyrate/octanoate copolymer, poly-3-hydroxybutyrate/hexanoate/decanoate terpolymer. Furthermore, aliphatic polyesters may comprise, for example—but are not limited to—the class of poly(hydroxyalkanoates), in particular, poly(propiolactone), poly(butyrolactone), poly(pivalolactone), poly(valerolactone) and poly(caprolactone), polyethylenesuccinate, polypropylenesuccinate, polybutylenesuccinate, polyhexamethylenesuccinate, polyethyleneadipate, polypropyleneadipate, polybutyleneadipate, polyhexamethyleneadipate, polyethyleneoxalate, polypropyleneoxalate, polybutyleneoxalate, polyhexamethyleneoxalate, polyethylenesebacate, polypropylenesebacate, polybutylenesebacate and polylactic acid (PLA) as well as corresponding polyesters modified with polycarbonates or MBS. The term "polylactic acid (PLA)" designates a homopolymer of preferably poly-L-lactide and any of its blends or alloys with other polymers; a co-polymer of lactic acid or lactide with other monomers, such as hydroxy-carboxylic acids, like for example glycolic acid, 3-hydroxy-butyric acid, 4-hydroxy-butyric acid, 4-hydroxy-valeric acid, 5-hydrooxy-valeric acid, 6-hydroxy-caproic acid and cyclic forms thereof; the terms "lactic acid" or "lactide" include L-lactic acid, D-lactic acid, mixtures and dimers thereof, i.e. L-lactide, D-lactide, meso-lacide and any mixtures thereof.

19. Polycarbonates and polyester carbonates.

20. Polyketones.

21. Polysulfones, polyether sulfones and polyether ketones.

22. Crosslinked polymers derived from aldehydes on the one hand and phenols, ureas and melamines on the other hand, such as phenol/formaldehyde resins, urea/formaldehyde resins and melamine/formaldehyde resins.

23. Drying and non-drying alkyd resins.

24. Unsaturated polyester resins derived from copolyesters of saturated and unsaturated dicarboxylic acids with polyhydric alcohols and vinyl compounds as crosslinking agents, and also halogen-containing modifications thereof of low flammability.

25. Crosslinkable acrylic resins derived from substituted acrylates, for example epoxy acrylates, urethane acrylates or polyester acrylates.

26. Alkyd resins, polyester resins and acrylate resins crosslinked with melamine resins, urea resins, isocyanates, isocyanurates, polyisocyanates or epoxy resins.

27. Crosslinked epoxy resins derived from aliphatic, cycloaliphatic, heterocyclic or aromatic glycidyl compounds, e.g. products of diglycidyl ethers of bisphenol A and bisphenol F, which are crosslinked with customary hardeners such as anhydrides or amines, with or without accelerators.

28. Natural polymers such as cellulose, rubber, gelatin and chemically modified homologous derivatives thereof, for example cellulose acetates, cellulose propionates and cellulose butyrates, or the cellulose ethers such as methyl cellulose; as well as rosins and their derivatives.

29. Blends of the aforementioned polymers (polyblends), for example PP/EPDM, Polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and copolymers, PA/HDPE, PA/PP, PA/PPO, PBT/PC/ABS or PBT/PET/PC.

In case of transparent and translucent polymer materials, the amount of light transmitted through the present materials, i.e. degree of translucency or transparency, mainly depends on well known parameters such as the particle loading, further additives used, haze level of the polymer matrix, and thickness of the material. The present materials usually are at least 80%, or rather more than 90% translucent in each part of the visible range (400-800 nm); preferred materials have good transparency, and especially are selected from clear-transparent sheets and films of thickness less than 10 mm (e.g. 0.01 to 5 mm). Preferred materials further share one or more of the following advantageous properties:

a full solar radiation transmittance (340-1800 nm) of less than 60%, a haze of less than 10%,
an electromagnetic shielding in the range 10-2000 MHz of less than 2 dB, and
a full visible light transmittance (400-800 nm) of more than 75%.

The present particles advantageously are used as an additive in the following plastic matrices (especially in the case of transparent and translucent polymer products):

Polycarbonate (PC) or a coating or coextruded layer on polycarbonate, polyesters, acrylics, halogenated polymers such as polyvinylchloride (PVC), polyolefins, aromatic homopolymers and copolymers derived from vinyl aromatic monomers and graft copolymers thereof such as acrylnitril-butadiene-styrene terpolymer (ABS), containing these polymers as major component or in essentially pure form (e.g. 50-100% b.w.), especially:

a polymer selected from PC, polymethylmethacrylate (PMMA), polyethyleneterephthalate (PET, PET-G), PVC, transparent ABS, polyvinylidene fluoride (PVDF), styrene-acrylnitril copolymer (SAN), polypropylene (PP), polyethylene (PE)

including blends, alloys, co-polymers.

Incorporation into the polymer matrix leads to plastic articles which may be highly transparent; they may be colorless (e.g. for clear glazings or films) or colored, e.g. by addition of a pigment or mixture of pigments, e.g. for applications wherein suitable light filtering or sun screening is desired, or in the case of coloured coatings. The present oxide or nitride materials allow high loading, giving access to high heat shielding effects. Preferable loadings are from 0.01 to 15%, especially 0.1 to 5% by weight of the final polymer composition.

The present particles may further be functionalized at their surface before incorporation using known methods, e.g. silanization, use of thiols, amines, phosphines, stearates, etc.

In preferred embodiments, the present particle and/or powder compositions are combined with one or more further additives, e.g. selected from the following materials:

1. Antioxidants 1.1. Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(a-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example, 2,6-di-nonyl-4-methylphenol, 2,4-dimethyl-6-(1'-methylundec-1-yl)phenol, 2,4-dimethyl-6-(1-methylheptadec-1'-yl) phenol, 2,4-dimethyl-6-(1'-methyltridec-1-yl)phenol and mixtures thereof.

1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol.

1.3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis (3,5-di-tert-butyl-4-hydroxyphenyl) adipate.

1.4. Tocopherols, for example α-tocopherol, β-tocopherol, γ-tocopherol, δ-tocopherol and mixtures thereof (vitamin E).

1.5. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis(2,6-dimethyl-4-hydroxyphenyl) disulfide.

1.6. Alkylidenebisphenols, for example 2, 2'-methylenebis (6-tert-butyl-4-methylphenol), 2,2'-methylenebis(6-tert-butyl-4-ethylphenol), 2,2'-methylenebis[4-methyl-6-(a-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis [6-(α-methylbenzyl)-4-nonylphenol], 2,2'-methylenebis[6-(α,α-dimethylbenzyl)-4-nonylphenol], 4,4'-methylenebis(2, 6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane,
ethylene glycol bis[3,3-bis(3'-tert-butyl-4'-hydroxyphenyl) butyrate], bis(3-tert-butyl-4-hydroxy-5-methyl-phenyl)dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis(3,5-di-tert-butyl-4-hydroxyphenyl)propane, 2,2-bis(5-tert-butyl-4-hydroxy2-methylphenyl)-4-n-dodecylmercaptobutane, 1,1,5,5-tetra-(5-tert-butyl-4-hydroxy-2-methylphenyl)pentane.

1.7. O-, N- and S-benzyl compounds, for example 3,5,3', 5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3,5-di-tert-butyl-4-hydroxybenzylmercaptoacetate.

1.8. Hydroxybenzylated malonates, for example dioctadecyl-2,2-bis(3,5-di-tert-butyl-2-hydroxybenzyl)malonate, di-octadecyl-2-(3-tert-butyl-4-hydroxy-5-methylbenzyl)malonate, didodecylmercaptoethyl-2,2-bis(3,5-di-tert-butyl-4-hydroxybenzyl)malonate, bis[4-(1,1,3,3-tetramethylbutyl) phenyl]-2,2-bis(3,5-di-tert-butyl-4-hydroxybenzyl) malonate.

1.9. Aromatic hydroxybenzyl compounds, for example 1,3,5-tris(3,5-di-tert-butyl-4-hydroxybenzyl)-2,4,6-trimethylbenzene, 1,4-bis(3,5-di-tert-butyl-4-hydroxybenzyl)-2,3, 5,6-tetramethyl benzene, 2,4,6-tris(3,5-di-tert-butyl-4-hydroxybenzyl)phenol.

1.10. Triazine compounds, for example 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris(3,5-di-tert-butyl-4-hydroxybenzyl)isocyanurate, 1,3,5-tris(4-tert-butyl-3-hydroxy-2,6-dimethylbenzyl)isocyanurate, 2,4, 6-tris(3,5-di-tert-butyl-4-hydroxyphenylethyl)-1,3,5-triazine, 1,3,5-tris(3,5-di-tert-butyl-4-hydroxyphenylpropionyl)-hexahydro-1,3,5-triazine, 1,3,5-tris(3,5-dicyclohexyl-4-hydroxybenzypisocyanurate.

1.11. Benzylphosphonates, for example dimethyl-2,5-di-tert-butyl-4-hydroxybenzylphosphonate, diethyl-3,5-di-tert-butyl-4-hydroxybenzylphosphonate, dioctadecyl3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid.

1.12. Acylaminophenols, for example 4-hydroxylauranilide, 4-hydroxystearanilide, octyl N-(3,5-di-tert-butyl-4-hydroxyphenyl)carbamate.

1.13. Esters of 13-(3,5-di-tert-butyl-4-hydroxyphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo [2.2.2]octane.

1.14. Esters of β-(5-tert-butyl-4-hydroxy-3-methylphenyl) propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo [2.2.2]octane; 3,9-bis[2-{3-(3-tert-butyl-4-hydroxy-5-methylphenyl)propionyloxy}-1,1-dimethylethyl]-2,4,8,10-tetraoxaspiro[5.5]-undecane.

1.15. Esters of β-(3,5-dicyclohexyl-4-hydroxyphenyl)propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis (hydroxyethyl)oxamide, 3-thiaundecanol, 3-thiapentadecanol, trimethylhexanediol, trimethylolpropane, 4-hydroxymethyl-1-phospha-2,6,7-trioxabicyclo [2.2.2]octane.

1.16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis (hydroxyethyl)oxamide, 3-thiaundecanol, 3-thiapentadecanol, trimethylhexanediol, trimethylolpropane, 4-hydroxymethyl-1-phospha-2,6,7-trioxabicyclo [2.2.2]octane.

1.17. Amides of β-(3,5-di-tert-butyl-4-hydroxyphenyl) propionic acid e.g. N,N'-bis(3,5-di-tert-butyl-4-hydroxyphenylpropionyl)hexamethylenediamide, N,N'-bis(3,5-di-tert-butyl-4-hydroxyphenylpropionyl)trimethylenediamide, N,N'-bis(3,5-di-tert-butyl-4-hydroxyphenylpropionyl)hydrazide, N,N'-bis[2-(3-[3,5-di-tert-butyl-4-hydroxyphenyl] propionyloxy)ethyl]oxamide (Naugard®XL-1, supplied by Uniroyal).

1.18. Ascorbic acid (vitamin C)

1.19. Aminic antioxidants, for example N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis (4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino] ethane, 1,2-bis(phenylamino)propane, (o-tolyl)biguanide, bis[4-(1',3'-dimethylbutyl)phenyl]amine, tert-octylated N-phenyl-1-naphthylamine, a mixture of mono- and dialkylated tert-butyl/tert-octyldiphenylamines, a mixture of mono- and dialkylated nonyldiphenylamines, a mixture of mono- and dialkylated dodecyldiphenylamines, a mixture of mono- and dialkylated isopropyl/isohexyldiphenylamines, a mixture of mono- and dialkylated tert-butyldiphenylamines, 2,3-dihydro-3,3-dimethyl-4H-1,4-benzothiazine, phenothiazine, a mixture of mono- and dialkylated tert-butyl/tert-octylphenothiazines, a mixture of mono- and dialkylated tert-octylphenothiazines, N-allylphenothiazine, N,N,N',N'-tetraphenyl-1,4-diaminobut-2-ene.

2. UV absorbers and light stabilizers 2.1. 2-(2'-Hydroxyphenyl)benzotriazoles, for example 2-(2'-hydroxy-5'-methylphenyl)-benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chloro-benzotriazole, 2-(3'-tert-butyl-2'-hydroxy-5'-methylphenyl)-5-chloro-benzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis-(α,α-dimethylbenzyl)-2'-hydroxyphenyl)benzotriazole, 2-(3'-tert-butyl-2'-hydroxy-5'-(2-octyloxycarbonylethyl)phenyl)-5-chloro-benzotriazole, 2-(3'-tert-butyl-5'-[2-(2-ethylhexyloxy)-carbonylethyl]-2'-hydroxyphenyl)-5-chloro-benzotriazole, 2-(3'-tert-butyl-2'-hydroxy-5'-(2-methoxycarbonylethyl)phenyl)-5-chloro-benzotriazole, 2-(3'-tert-butyl-2'-hydroxy-5'-(2-methoxycarbonylethyl) phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxyphenyl) benzotriazole, 2-(3'-dodecyl-2'-hydroxy-5'-methylphenyl) benzotriazole, 2-(3'-tert-butyl-2'-hydroxy-5'-(2-isooctyloxycarbonylethyl)phenylbenzotriazole, 2,2'-methylene-bis[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol 300; [R—CH$_2$CH$_2$—COO—CH$_2$CH$_2$—]$_2$, where R=3'-tert-butyl-4'-hydroxy-5'-2H-benzotriazol-2-ylphenyl, 2-[2'-hydroxy-3'-(α,α-dimethylbenzyl)-5'-(1,1,3,3-tetramethylbutyl)-phenyl]-benzotriazole; 2-[2'-hydroxy-3'-(1,1,3,3-tetramethylbutyl)-5'-(α,α-dimethylbenzyl)-phenyl] benzotriazole.

2.2. 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

2.3. Esters of substituted and unsubstituted benzoic acids, for example 4-tert-butyl-phenyl salicylate, phenyl salicylate, octylphenyl salicylate, dibenzoyl resorcinol, bis(4-tert-butylbenzoyl)resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4- hydroxybenzoate, 2-methyl-4,6-di-tert-butylphenyl 3,5-di-tert-butyl-4-hydroxybenzoate.

2.4. Acrylates, for example ethyl α-cyano-β,β-diphenylacrylate, isooctyl α-cyano-β,β-diphenylacrylate, methyl α-carbomethoxycinnamate, methyl α-cyano-β-methyl-p-methoxycinnamate, butyl α-cyano-β-methyl-p-methoxycinnamate, methyl α-carbomethoxy-p-methoxycinnamate, N-(β-carbomethoxy-β-cyanovinyl)-2-methylindoline, neopentyl tetra(α-cyano-β,β-diphenylacrylate.

2.5. Nickel compounds, for example nickel complexes of 2,2'-thio-bis[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenylundecylketoxime, nickel complexes of 1-phenyl-4-lauroyl-5-hydroxypyrazole, with or without additional ligands.

2.6. Sterically hindered amines, for example bis(2,2,6,6-tetramethyl-4-piperidyl)sebacate, bis(2,2,6,6-tetramethyl-4-piperidyl)succinate, bis(1,2,2,6,6-pentamethyl-4-piperidyl) sebacate, bis(1-octyloxy-2,2,6,6-tetramethyl-4-piperidyl) sebacate, bis(1,2,2,6,6-pentamethyl-4-piperidyl) n-butyl-3,5-di-tert-butyl-4-hydroxybenzylmalonate, the condensate of 1-(2-hydroxyethyl)-2,2,6,6-tetramethyl-4-hydroxypiperidine and succinic acid, linear or cyclic condensates of N,N'-bis(2,2,6,6-tetramethyl-4-piperidyl)hexamethylenediamine and 4-tertoctylamino-2,6-dichloro-1,3,5-triazine, tris(2,2,6,6-tetramethyl-4-piperidyl)nitrilotriacetate, tetrakis(2,2,6,6-tetramethyl-4-piperidyl)-1,2,3,4-butanetetracarboxylate, 1,1'-(1,2-ethanediyl)bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)malonate, 3-n-octyl-7,7,9,9-tetramethyl-1,3,8-triazaspiro[4.5]decane-2,4-dione, bis(1-octyloxy-2,2,6,6-tetramethylpiperidyl)sebacate, bis(1-octyloxy-2,2,6,6-tetramethylpiperidyl)succinate, linear or cyclic condensates of N,N'-bis(2,2,6,6-tetramethyl-4-piperidyl)hexamethylenediamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-aminopropylamino)ethane, the condensate of 2-chloro-4,6-di-(4-n-butylamino-1,2,2,6,6-pentamethylpiperidyl)-1,3,5-triazine and 1,2-bis(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidine-2,5-dione, 3-dodecyl-1-(1,2,2,6,6-pentamethyl-4-piperidyl) pyrrolidine-2,5-dione, a mixture of 4-hexadecyloxy- and 4-stearyloxy-2,2,6,6-tetramethylpiperidine, a condensate of N,N'-bis(2,2,6,6-tetramethyl-4-piperidyl)hexamethylenediamine and 4-cyclohexylamino-2,6-dichloro-1,3,5-triazine, a condensate of 1,2-bis(3-aminopropylamino)ethane and 2,4,6-trichloro-1,3,5-triazine as well as 4-butylamino-2,2,6,6-tetramethylpiperidine (CAS Reg. No. [136504-96-6]); a condensate of 1,6-hexanediamine and 2,4,6-trichloro-1,3,5-triazine as well as N,N-dibutylamine and 4-butylamino-2,2,6,6-tetramethylpiperidine (CAS Reg. No. [192268-64-7]); N-(2,2,6,6-tetramethyl-4-piperidyl)-n-dodecylsuccinimide, N-(1,2,2,6,6-pentamethyl-4-piperidyl)-n-dodecylsuccinimide, 2-undecyl-7,7,9,9-tetramethyl-1-oxa-3,8-diaza-4-oxospiro[4,5]decane, a reaction product of 7,7,9,9-tetramethyl-2-cycloundecyl-1-oxa-3,8-diaza-4-oxospiro-[4,5]decane and epichlorohydrin, 1,1-bis(1,2,2,6,6-pentamethyl-4-piperidyloxycarbonyl)-2-(4-methoxyphenyl)ethene, N,N'-bis-formyl-N,N'-bis(2,2,6,6-tetramethyl-4-piperidyl)hexamethylenediamine, a diester of 4-methoxymethylenemalonic acid with 1,2,2,6,6-pentamethyl-4-hydroxypiperidine, poly[methylpropyl-3-oxy-4-(2,2,6,6-tetramethyl-4-piperidyl)]siloxane, a reaction product of maleic acid anhydride-α-olefin copolymer with 2,2,6,6-tetramethyl-4-aminopiperidine or 1,2,2,6,6-pentamethyl-4-aminopiperidine, 2,4-bis[N-(1-cyclohexyloxy-2,2,6,6-tetramethylpiperidine-4-yl)-N-butylamino]-6-(2-hydroxyethyl)amino-1,3,5-triazine, 1-(2-hydrooxy-2-methylpropoxy)-4-octadecanoyloxy-2,2,6,6-tetramethylpiperidine, 5-(2-ethylhexanoyl)oxymethyl-3,3,5-trimethyl-2-morpholinone, Sanduvor (Clariant; CAS Reg. No. 106917-31-1], 5-(2-ethylhexanoyl)oxymethyl-3,3,5-trimethyl-2-morpholinone, the reaction product of 2,4-bis-[(1-cyclohexyloxy-2,2,6,6-piperidine-4-yl)butylamino]-6-chloro-s-triazine with N,N'-bis(3-aminopropyl) ethylenediamine), 1,3,5-tris(N-cyclohexyl-N-(2,2,6,6-tetramethylpiperazine-3-one-4-yl)amino)-s-triazine, 1,3,5-tris(N-cyclohexyl-N-(1,2,2,6,6-pentamethylpiperazine-3-one-4-yl)amino)-s-triazine.

2.7. Oxamides, for example 4, 4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides.

2.8. 2-(2-Hydroxyphenyl)-1,3,5-triazines, for example 2, 4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropoxy)phenyl]-4,6-bis(2,4-dimethyl)-1,3,5-triazine, 2-[2-hydroxy-4-(2-hydroxy-3-octyloxypropyloxy)phenyl]-4,6-bis(2,4-dimethyl)-1,3,5-triazine, 2-[4-(dodecyloxy/tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxypropoxy)phenyl]-4,6-bis(2,4-dimethylphenyl)-1,3,5-triazine, 2-(2-hydroxy-4-hexyloxy) phenyl-4,6-diphenyl-1,3,5-triazine, 2-(2-hydrooxy-4-methoxyphenyl)-4,6-diphenyl-1,3,5-triazine, 2,4,6-tris[2-hydroxy-4-(3-butoxy-2-hydroxypropoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl)-1,3,5-triazine, 2,4-bis(4-[2-ethylhexyloxy]-2-hydroxyphenyl)-6-(4-methoxyphenyl)-1, 3,5-triazine.

3. Metal deactivators, for example N,N'-diphenyloxamide, N-salicylal-N'-salicyloyl hydrazine, N,N'-bis(salicyloyl)hydrazine, N,N'-bis(3,5-di-tert-butyl-4-hydroxyphenylpropionyl)hydrazine, 3-salicyloylamino-1,2,4-triazole, bis(benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl)oxalyl dihydrazide, N,N'-bis(salicyloyl)thiopropionyl dihydrazide.

4. Phosphites and phosphonites, for example triphenyl phosphite, diphenylalkyl phosphites, phenyldialkyl phosphites, tris(nonylphenyl) phosphite, trilauryl phosphite, trioctadecyl phosphite, distearylpentaerythritol diphosphite, tris(2, 4-di-tert-butylphenyl) phosphite, diisodecyl pentaerythritol diphosphite, bis(2,4-di-tert-butylphenyl)pentaerythritol diphosphite, bis(2,4-dicumylphenyl)pentaerythritol diphosphite, bis(2,6-di-tert-butyl-4-methylphenyl)pentaerythritol diphosphite, diisodecyloxypentaerythritol diphosphite, bis(2,4-di-tert-butyl-6-methylphenyl)pentaerythritol diphosphite, bis(2,4,6-tris(tert-butylphenyl)pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-12H-dibenz[d,g]-1,3,2-dioxaphosphocin, bis(2,4-di-tert-butyl-6-methylphenyl) methyl phosphite, bis(2,4-di-tert-butyl-6-methylphenyl) ethyl phosphite, 6-fluoro-2,4,8,10-tetra-tert-butyl-12-methyl-dibenz[d,g]-1,3,2-dioxaphosphocin, 2,2',2''-nitrilo[triethyltris(3,3',5,5'-tetra-tert-butyl-1,1'-biphenyl-2,2'-diyl) phosphite], 2-ethylhexyl(3,3',5,5'-tetra-tert-butyl-1,1'-biphenyl-2,2'-diyl)phosphite, 5-butyl-5-ethyl-2-(2,4,6-tri-tert-butylphenoxy)-1,3,2-dioxaphosphirane.

The following phosphites are especially preferred:

Tris(2,4-di-tert-butylphenyl) phosphite (Irgafos® 168, Ciba Specialty Chemicals Inc.), tris(nonylphenyl) phosphite,

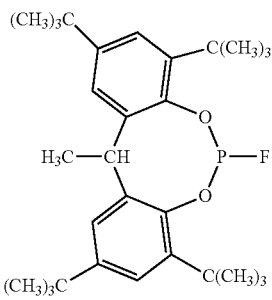
(A)

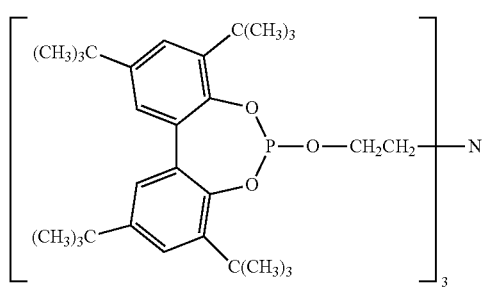
(B)

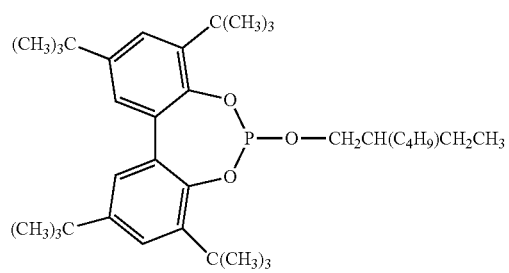
(C)

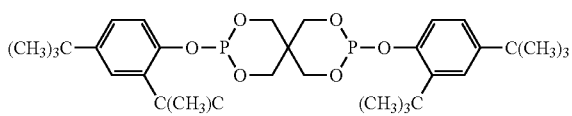
(D)

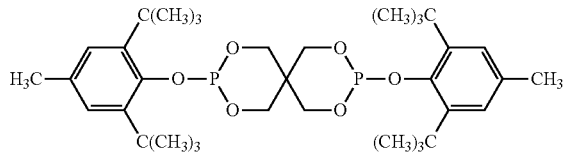
(E)

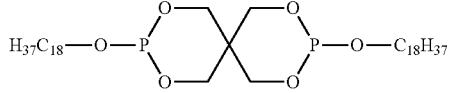
(F)

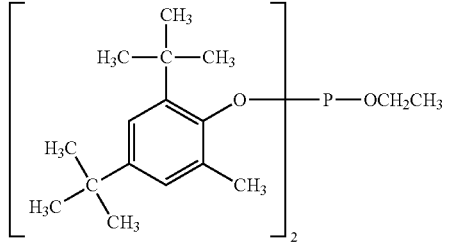
(G)

5. Hydroxylamines, for example N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N-dialkylhydroxylamine derived from hydrogenated tallow amine.

6. Nitrones, for example, N-benzyl-alpha-phenylnitrone, N-ethyl-alpha-methylnitrone, N-octylalpha-heptylnitrone, N-lauryl-alpha-undecylnitrone, N-tetradecyl-alpha-tridecylnnitrone, N-hexadecyl-alpha-pentadecylnitrone, N-octadecyl-alpha-heptadecylnitrone, N-hexadecyl-alpha-heptadecylnitrone, N-ocatadecyl-alpha-pentadecylnitrone, N-heptadecyl-alpha-heptadecylnitrone, N-octadecyl-alpha-hexadecylnitrone, nitrone derived from N,N-dialkylhydroxylamine derived from hydrogenated tallow amine.

7. Thiosynergists, for example dilauryl thiodipropionate, dimistryl thiodipropionate, distearyl thiodipropionate or distearyl disulfide.

8. Peroxide scavengers, for example esters of β-thiodipropionic acid, for example the lauryl, stearyl, myristyl or tridecyl esters, mercaptobenzimidazole or the zinc salt of 2-mercaptobenzimidazole, zinc dibutyldithiocarbamate, dioctadecyl disulfide, pentaerythritol tetrakis(β-dodecylmercapto)propionate.

9. Polyamide stabilizers, for example copper salts in combination with iodides and/or phosphorus compounds and salts of divalent manganese.

10. Basic co-stabilizers, for example melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids, for example calcium stearate, zinc stearate, magnesium behenate, magnesium stearate, sodium ricinoleate and potassium palmitate, antimony pyrocatecholate or zinc pyrocatecholate.

11. Nucleating agents, for example inorganic substances, such as talcum, metal oxides, such as titanium dioxide or magnesium oxide, phosphates, carbonates or sulfates of, preferably, alkaline earth metals; organic compounds, such as mono- or polycarboxylic acids and the salts thereof, e.g.

4-tert-butylbenzoic acid, adipic acid, diphenylacetic acid, sodium succinate or sodium benzoate; polymeric compounds, such as ionic copolymers (ionomers). Especially preferred are 1,3:2,4-bis(3',4'-dimethylbenzylidene)sorbitol, 1,3:2,4-di(paramethyldibenzylidene)sorbitol, and 1,3:2,4-di(benzylidene)sorbitol.

12. Fillers and reinforcing agents, for example calcium carbonate, silicates, glass fibres, glass beads, asbestos, talc, kaolin, mica, barium sulfate, metal oxides and hydroxides, carbon black, graphite, wood flour and flours or fibers of other natural products, synthetic fibers.

13. Other additives, for example plasticisers, lubricants, emulsifiers, pigments, rheology additives, catalysts, flow-control agents, optical brighteners, flameproofing agents, antistatic agents and blowing agents.

14. Benzofuranones and indolinones, for example those disclosed in U.S. Pat. No. 4,325,863; U.S. Pat. No. 4,338,244; U.S. Pat. No. 5,175,312; U.S. Pat. No. 5,216,052; U.S. Pat. No. 5,252,643; DE-A-4316611; DE-A-4316622; DE-A-4316876; EP-A-0589839, EP-A-0591102; EP-A-1291384 or 3-[4-(2-acetoxyethoxy)phenyl]-5,7-di-tert-butylbenzofuran-2-one, 5,7-di-tert-butyl-3-[4-(2-stearoyloxyethoxy)phenyl]benzofuran-2-one, 3,3'-bis[5,7-di-tert-butyl-3-(4-[2-hydroxyethoxy]phenyl)benzofuran-2-one], 5,7-di-tert-butyl-3-(4-ethoxyphenyl)benzofuran-2-one, 3-(4-acetoxy-3,5-dimethylphenyl)-5,7-di-tert-butylbenzofuran-2-one, 3-(3,5-dimethyl-4-pivaloyloxyphenyl)-5,7-di-tert-butylbenzofuran-2-one, 3-(3,4-dimethylphenyl)-5,7-di-tert-butylbenzofuran-2-one, 3-(2,3-dimethylphenyl)-5,7-di-tert-butylbenzofuran-2-one, 3-(2-acetyl-5-isooctylphenyl)-5-isooctylbenzofuran-2-one.

One or more of these further additives are usually contained in an amount of 0.01 to about 10% of the composition, often in a concentration level of about 0.1 to 5% by weight of the final composition. Important are, for example, antioxidants (e.g. phenolic antioxidants and/or phosph(on)ites listed above) and, for many applications, flame retardants. Clarifiers/nucleating agents may be added to provide or improve transparency, especially in polyolefin compositions. Especially preferred is the combination of the present nanoparticles with light stabilizers such as UV absorbers and/or sterically hindered amines (HALS). Zinc oxide in particular is a well known plastic additive that absorbs strongly UV radiation, improving plastic durability. Further, strong synergistic effects are known when combined with light stabilizers such as HALS (see e.g. EP-A-690094; U.S. Pat. No. 5,948,836).

Plastic materials, especially films of the present invention, containing polymers and nanoparticles as described above, advantageously may be used in technical application fields such as architectural glazing, glazing in building and construction, automotive glazing, transportation glazing, agricultural films and structures. The materials may be solid sheets, monolithic sheets, twin-wall sheets, multi-wall sheets, flat sheets, corrugated sheets, films, oriented or mono- or biaxially oriented films, lamination films, capstock films. Specific application fields include wintergarden and veranda buildings, facades, skylights, pool covers and enclosures, roof structures, vaults, walkways, shelters, signage, interior and exterior design elements, sun shades, side window, rear window, panorama roof, greenhouses.

Main applications are heat-shielding, light management, heat management, energy management, solar control; also of importance are laser welding, security features, marking, tracers, heat transfer.

Compositions of the invention preferably are unplasticized. Compositions of the invention do not require any further metals or metallic particles and usually do not contain such components. Of special technical interest are rigid, transparent compositions, such as plates or sheets, for automotive or architectural glazings, or translucent or transparent polyolefin or polyolefin copolymer films, especially for agricultural applications.

The additives of the invention and optional further components may be added to the polymer material individually or mixed with one another. If desired, the individual components can be mixed with one another before incorporation into the polymer for example by dry blending, compaction or in the melt.

The incorporation of the additives of the invention and optional further components into the polymer is carried out by known methods such as dry blending in the form of a powder, or wet mixing in the form of solutions, dispersions or suspensions for example in an inert solvent, water or oil. The additives of the invention and optional further additives may be incorporated, for example, before or after molding or also by applying the dissolved or dispersed additive or additive mixture to the polymer material, with or without subsequent evaporation of the solvent or the suspension/dispersion agent. They may be added directly into the processing apparatus (e.g. extruders, internal mixers, etc), e.g. as a dry mixture or powder or as solution or dispersion or suspension or melt.

The incorporation can be carried out in any heatable container equipped with a stirrer, e.g. in a closed apparatus such as a kneader, mixer or stirred vessel. The incorporation is preferably carried out in an extruder or in a kneader. It is immaterial whether processing takes place in an inert atmosphere or in the presence of oxygen.

The addition of the additive or additive blend to the polymer can be carried out in all customary mixing machines in which the polymer is melted and mixed with the additives. Suitable machines are known to those skilled in the art. They are predominantly mixers, kneaders and extruders.

The process is preferably carried out in an extruder by introducing the additive during processing.

Particularly preferred processing machines are single-screw extruders, contrarotating and corotating twin-screw extruders, planetary-gear extruders, ring extruders or cokneaders. It is also possible to use processing machines provided with at least one gas removal compartment to which a vacuum can be applied.

Suitable extruders and kneaders are described, for example, in *Handbuch der Kunststoffextrusion, Vol.* 1 Grundlagen, Editors F. Hensen, W. Knappe, H. Potente, 1989, pp. 3-7, ISBN:3-446-14339-4 (Vol. 2 Extrusionsanlagen 1986, ISBN 3-446-14329-7).

For example, the screw length is 1-60 screw diameters, preferably 20-48 screw diameters. The rotational speed of the screw is preferably 1-800 rotations per minute (rpm), very particularly preferably 25-400 rpm.

The maximum throughput is dependent on the screw diameter, the rotational speed and the driving force. The process of the present invention can also be carried out at a level lower than maximum throughput by varying the parameters mentioned or employing weighing machines delivering dosage amounts.

If a plurality of components is added, these can be premixed or added individually.

The additives of the invention and optional further additives can also be added to the polymer in the form of a masterbatch ("concentrate") which contains the components in a concentration of, for example, about 5% to about 80% and preferably 5% to about 40% by weight incorporated in a polymer and/or dispersed in a suitable solvent. The polymer must not be necessarily of identical structure than the polymer where the additives are added finally. In such operations, the polymer can be used in the form of powder, granules, solutions, suspensions or in the form of latices.

Incorporation can take place prior to or during the shaping operation, or by applying the dissolved or dispersed compound to the polymer, with or without subsequent evaporation of the solvent. In the case of elastomers, these can also be stabilized as latices. A further possibility for incorporating the additives of the invention into polymers is to add them before, during or directly after the polymerization of the corresponding monomers or prior to crosslinking. In this context the additive of the invention can be added as it is or else in encapsulated form (for example in waxes, oils or polymers).

The materials containing the additives of the invention described herein can be used for the production of moldings, rotomolded articles, injection molded articles, blow molded articles, films, tapes, mono-filaments, fibers, nonwovens, profiles, adhesives or putties, surface coatings and the like.

The present matrix material may also be a coating material or a cured coating comprising as component (a) a suitable binder. The binder (component (A)) can in principle be any binder which is customary in industry, for example those described in Ullmann's Encyclopedia of Industrial Chemistry, 5th Edition, Vol. A18, pp. 368-426, VCH, Weinheim 1991. In general, it is a film-forming binder based on a thermoplastic or thermosetting resin, predominantly on a thermosetting resin. Examples thereof are alkyd, acrylic, polyester, phenolic, melamine, epoxy and polyurethane resins and mixtures thereof.

Component (A) can be a cold-curable or hot-curable binder; the addition of a curing catalyst may be advantageous. Suitable catalysts which accelerate curing of the binder are described, for example, in Ullmann's Encyclopedia of Industrial Chemistry, Vol. A18, p. 469, VCH Verlagsgesellschaft, Weinheim 1991.

Preference is given to coating compositions in which component (A) is a binder comprising a functional acrylate resin and a crosslinking agent.

Examples of coating compositions containing specific binders are:

1. paints based on cold- or hot-crosslinkable alkyd, acrylate, polyester, epoxy or melamine resins or mixtures of such resins, if desired with addition of a curing catalyst;
2. two-component polyurethane paints based on hydroxyl-containing acrylate, polyester or polyether resins and aliphatic or aromatic isocyanates, isocyanurates or polyisocyanates;
3. two-component polyurethane paints based on thiol-containing acrylate, polyester or polyether resins and aliphatic or aromatic isocyanates, isocyanurates or polyisocyanates;
4. one-component polyurethane paints based on blocked isocyanates, isocyanurates or polyisocyanates which are deblocked during baking, if desired with addition of a melamine resin;
5. one-component polyurethane paints based on aliphatic or aromatic urethanes or polyurethanes and hydroxyl-containing acrylate, polyester or polyether resins;
6. one-component polyurethane paints based on aliphatic or aromatic urethaneacrylates or polyurethaneacrylates having free amino groups within the urethane structure and melamine resins or polyether resins, if necessary with curing catalyst;
7. two-component paints based on (poly)ketimines and aliphatic or aromatic isocyanates, isocyanurates or polyisocyanates;
8. two-component paints based on (poly)ketimines and an unsaturated acrylate resin or a polyacetoacetate resin or a methacrylamidoglycolate methyl ester;
9. two-component paints based on carboxyl- or amino-containing polyacrylates and polyepoxides;
10. two-component paints based on acrylate resins containing anhydride groups and on a polyhydroxy or polyamino component;
11. two-component paints based on acrylate-containing anhydrides and polyepoxides;
12. two-component paints based on (poly)oxazolines and acrylate resins containing anhydride groups, or unsaturated acrylate resins, or aliphatic or aromatic isocyanates, isocyanurates or polyisocyanates;
13. two-component paints based on unsaturated polyacrylates and polymalonates;
14. thermoplastic polyacrylate paints based on thermoplastic acrylate resins or externally crosslinking acrylate resins in combination with etherified melamine resins;
15. paint systems based on siloxane-modified or fluorine-modified acrylate resins;
16. paint systems, especially for clearcoats, based on malonate-blocked isocyanates with melamine resins (e.g. hexamethoxymethylmelamine) as crosslinker (acid catalyzed);
17. UV-curable systems based on oligomeric urethane acrylates and/or acrylatacrylaten, if desired in combination with other oligomers or monomers;
18. dual cure systems, which are cured first by heat and subsequently by UV or electron irradiation, or vice versa, and whose components contain ethylenic double bonds capable to react on irradiation with UV light in presence of a photoinitiator or with an electron beam.

Coating systems based on siloxanes are also possible, e.g. systems described in WO 98/56852, WO 98/56853, DE-A-2914427, or DE-A-4338361.

In addition to components (A) and (B), the coating composition according to the invention preferably comprises as component (C) a light stabilizer of the sterically hindered amine type, the 2-(2-hydroxyphenyl)-1,3,5-triazine and/or 2-hydroxyphenyl-2H-benzotriazole type, for example as mentioned in the above list in sections 2.1, 2.6 and 2.8. Further examples for light stabilizers of the 2-(2-hydroxyphenyl)-1,3,5-triazine type advantageously to be added can be found e.g. in the publications U.S. Pat. No. 4,619,956, EP-A-434608, U.S. Pat. No. 5,198,498, U.S. Pat. No. 5,322,868, U.S. Pat. No. 5,369,140, U.S. Pat. No. 5,298,067, WO-94/18278, EP-A-704437, GB-A-2297091, WO-96/28431. Of special technical interest is the addition of compounds of the classes 2-resorcinyl-4,6-diphenyl-1,3,5-triazine, 2-resorcinyl-4,6-bis(biphenylyl)-1,3,5-triazine, and/or 2-hydroxyphenyl-2H-benztriazole.

Apart from components (A), (B) and, if used, (C), the coating composition can also comprise further components, examples being solvents, pigments, dyes, plasticizers, stabilizers, rheologic or thixotropic agents, drying catalysts and/or levelling agents. Examples of possible components are described in Ullmann's Encyclopedia of Industrial Chemistry, 5th Edition, Vol. A18, pp. 429-471, VCH, Weinheim 1991.

Possible drying catalysts or curing catalysts are, for example, free (organic) acids or bases, or (organic) blocked acids or bases which may be deblocked by thermal treatment or irradiation, organometallic compounds, amines, amino-containing resins and/or phosphines. Examples of organometallic compounds are metal carboxylates, especially those of the metals Pb, Mn, Co, Zn, Zr or Cu, or metal chelates, especially those of the metals Al, Ti, Zr or Hf, or organometallic compounds such as organotin compounds.

Examples of metal carboxylates are the stearates of Pb, Mn or Zn, the octoates of Co, Zn or Cu, the naphthenates of Mn and Co or the corresponding linoleates, resinates or tallates.

Examples of metal chelates are the aluminium, titanium or zirconium chelates of acetylacetone, ethyl acetylacetate, salicylaldehyde, salicylaldoxime, o-hydroxyacetophenone or ethyl trifluoroacetylacetate, and the alkoxides of these metals.

Examples of organotin compounds are dibutyltin oxide, dibutyltin dilaurate or dibutyltin dioctoate.

Examples of amines are, in particular, tertiary amines, for example tributylamine, triethanolamine, N-methyldiethanolamine, N-dimethylethanolamine, N-ethylmorpholine, N-methylmorpholine or diazabicyclooctane (triethylenediamine), diazabicycloundecene, DBN (=1,5-diazabicyclo[4.3.0]non-5-ene), and salts thereof. Further examples are quaternary ammonium salts, for example trimethylbenzylammonium chloride.

Amino-containing resins are simultaneously binder and curing catalyst. Examples thereof are amino-containing acrylate copolymers.

The curing catalyst used can also be a phosphine, for example triphenylphosphine.

The novel coating compositions can also be radiation-curable coating compositions. In this case, the binder essentially comprises monomeric or oligomeric compounds containing ethylenically unsaturated bonds (prepolymers), which after application are cured by actinic radiation, i.e. converted into a crosslinked, high molecular weight form. Where the system is UV-curing, it generally contains at least one photoinitiator as well. Corresponding systems are described in the above-mentioned publication Ullmann's Encyclopedia of Industrial Chemistry, 5th Edition, Vol. A18, pages 451-453. In radiation-curable coating compositions, the novel stabilizers can also be employed without the addition of sterically hindered amines.

The coating compositions according to the invention can be applied to any desired substrates, for example to metal, wood, plastic or ceramic materials. They are preferably used as topcoat in the finishing of automobiles. If the topcoat comprises two layers, of which the lower layer is pigmented and the upper layer is not pigmented, the novel coating composition can be used for either the upper or the lower layer or for both layers, but preferably for the upper layer.

The novel coating compositions can be applied to the substrates by the customary methods, for example by brushing, spraying, pouring, dipping or electrophoresis; see also Ullmann's Encyclopedia of Industrial Chemistry, 5th Edition, Vol. A18, pp. 491-500.

Depending on the binder system, the coatings can be cured at room temperature or by heating. The coatings are preferably cured at 50-150° C., and in the case of powder coatings or coil coatings even at higher temperatures.

The coatings obtained in accordance with the invention have excellent resistance to the damaging effects of light, oxygen and heat; particular mention should be made of the good light stability and weathering resistance of the coatings thus obtained, for example paints.

The coating compositions can comprise an organic solvent or solvent mixture in which the binder is soluble. The coating composition can otherwise be an aqueous solution or dispersion. The vehicle can also be a mixture of organic solvent and water. The coating composition may be a high-solids paint or can be solvent-free (e.g. a powder coating material). Powder coatings are, for example, those described in Ullmann's Encyclopedia of Industrial Chemistry, 5th Ed., A18, pages 438-444. The powder coating material may also have the form of a powder-slurry (dispersion of the powder preferably in water).

The pigments can be inorganic, organic or metallic pigments. The novel coating compositions preferably contain no pigments and are used as a clearcoat.

The present matrix material may also be an inorganic polymer composition or organic/inorganic polymer hybrid system, e.g. a sol-gel coating. Examples are metal oxide systems based on metal alkoxides such as Si, Ti, Xr, Al alkoxides, or hybrid coatings based on a mixture of resin+metal alkoxide; examples for such systems and their preparation are given in section [0169] of US20070187653, or EP-A-1676890 col. 18, lines 9-16, which passages are hereby incorporated by reference.

An application of specific interest is the incorporation of the present powder materials into optical filters, especially as used for plasma display panels.

Examples for useful tungsten bronzes are: $Na_{0.33}WO_3$, $K_{0.33}WO_3$, $Cs_{0.33}WO_3$, $Ba_{0.33}WO_3$, $Rb_{0.33}WO_3$ Examples for mixed oxides are: $Na_{0.8}Mo_{0.05}W_{0.95}O_3$ or $Rb_{03}M_{0.5}W_{0.5}O_3$ Preferred is the use of tungsten suboxides (e.g. $WO_{2.72}$), and tungsten bronzes (e.g. $Na_{0.33}WO_3$, $Cs_{0.33}WO_3$)

Especially preferred are materials comprising $Cs_{0.2}WO_3$ and $Cs_{0.3}WO_3$.

Laser Welding

Heat-input amount can be referred to as the thermal energy supplied by near infrared radiation. Due to the increased heat input amount of near infrared radiation the above referenced tungsten oxides and tungstates can be used in processes like laser welding of plastics, NIR curing of coatings, drying of printing inks, fixing of ink toners to a substrate, heating of plastic preforms, laser marking of plastics, paper and other natural or artificial substrates.

The NIR radiation used in the process according to the invention is short-wave infrared radiation in the wavelength range from about 700 nm to about 3000 nm. Radiation sources for NIR radiation include, for example, conventional NIR radiation emitters, which are available commercially (for example, from Adphos) with the main emission in the range from 800 to 1500 nm, diode lasers, fibre lasers or a Nd:YAG laser.

Infrared Curing

The NIR curing of coatings can be used for all type of coatings including both pigmented and unpigmented coating materials. Depending upon the nature of the organic binder, coatings may comprise solvent and/or water or may be solventless or water-free. They may also comprise fillers and other additives in addition to the pigments. Any kind of coating is suitable in the method according to the invention, for example, powder coatings, clearcoats, high-solids coatings, effect coatings, high-gloss coatings, silk-finish coatings, matt-finish coatings, spray coatings, dip-coatings, pour-coatings etc. Corresponding raw materials and compositions are known to the person skilled in the art and are described, for example, in "Lehrbuch der Lacktechnologie", Vincentz Verlag, 1998.

NIR Curing of coatings is state of the art in the field of coil coatings. As coating formulations per se do not absorb NIR-radiation, the heating rate of the coating during drying and for curing is therefore strongly dependent from several factors:
  substrate
  pigmentation degree
  pigment chemistry This leads to draw backs in certain coating processes. These are:

a) low energy efficiency due to loss of NIR radiation
b) different curing speeds of e.g. a black (FW 200) pigmented against a white (TiO2) pigmented system.
c) NIR-drying can't be used for clearcoat applications
d) Especially white RAL shades as 9002, 9010 & 9016 show low energy efficiencies during NIR curing.

There is therefore a need for near infrared absorbers that are colorless as well as transparent to overcome the draw backs a-d. State of the art materials are either colored (Lumogen IR 765, 788) or show a strong haze (Minatec 230 A-IR, Lazerflair 825, $LaB_6$) when incorporated into a coating formulation. Thus, an additional requirement for the IR absorber used is to avoid haze.

Minatec 230 A-IR consists of a specific antimony tin composition (Merck), Lazerflair 825 is a mica based platelet type pigment (Merck) and Lumogen IR 765 and IR 788 are organic quaterrylene-bisimides (BASF). $LaB_6$ can be purchased from Aldrich.

The heat-input corresponds to the temperature reached after NIR curing and drying of coatings, curing and drying of adhesives, laser welding, drying of printings, fixing of ink toners to a substrate heating of plastic performs, laser marking of plastics, paper and other natural or artificial substrates.

The temperature reached is nearly the same using the above referenced tungsten oxides and tungstates or using carbon black. This unexpected effect of the extremely high temperatures that can be reached using the above referenced tungsten oxides and tungstates can't be explained only with the high near infrared absorption. Materials or concentrations having a higher absorption integral in the near infrared are showing lower temperature increases after a NIR curing cycle (Example 3.1).

Laser radiation is used in welding processes for producing fusion bonded plastics. Typical laser wavelengths used are: 808 nm, 850 nm, 940 nm, 980 nm or 1064 nm. For the absorption of the laser radiation and its conversion to heat for the melting process, it is necessary to add an IR absorber. A common IR absorber is carbon black. Due to the dark color welding of brightly colored or transparent parts is impossible.

The concentration of the tungsten oxide or of the tungstate is 5-500 ppm, preferably 50-200 ppm.

The tungsten oxide or of the tungstate may be incorporated directly into the plastics parts by known processes like injection molding, extrusion, and the like.

Examples of plastics used in a laser welding process are polypropylene, polyvinylbutyrale, polyamide, polycarbonate, polycarbonate-polyethylene terephthalate-blends, polycarbonatepolybutylene terephthalate-blends, polycarbonate-acrylnitrile/styrene/acrylnitrile-copolymer-blends, polycarbonate-acrylnitrile/butadiene/styrene-copolymer-blends, polymethylmethacrylate-acrylnitrile/butadiene/styrene-copolymer-blends (MABS), polyethylene terephthalate, polybutylene terephthalate, polymethylmethacrylate, polybutylacrylate, polymethylmethacrylate-polyvinylidenedifluoride-blends, acrylnitrile/butadiene/styrene-copolymere (ABS), styrene/acrylnitrile-copolymere (SAN) and polyphenylenesulfone as well as mixtures thereof.

In a further embodiment the invention relates to the use of a blend comprising tungsten oxide and/or tungstate as defined above and in addition a dithiolen metal complex of the formula I or II as disclosed in the European Patent application EP 07 100657.1 to increase the heat-input amount of near infrared radiation.

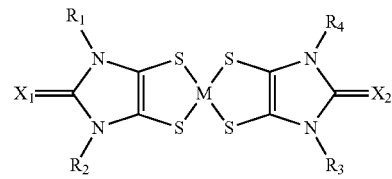

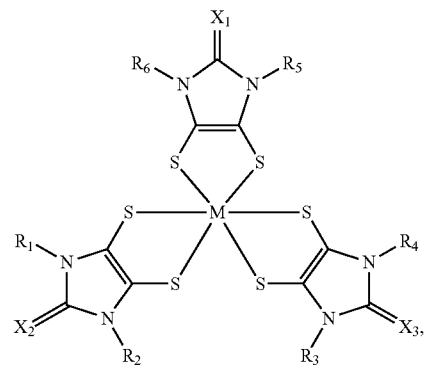

wherein

M Ni, Pd, Pt, Au, Ir, Fe, Zn, W, Cu, Mo, In, Mn, Co, Mg, V, Cr and Ti, $X_1$, $X_2$ and $X_3$ independently of one another are sulfur or oxygen;

$R_1$, $R_2$, $R_3$, $R_4$, $R_5$ and $R_6$ independently of one another are hydrogen, $NR_7R_8$, $C_1$-$C_{18}$alkyl, aryl, aralkyl, heteroarylalkyl, wherein $R_7$ and $R_8$ independently of one another are $C_1$-$C_{18}$alkyl, aryl, aralkyl, heteroarylalkyl.

Examples for $C_1$-$C_{18}$alkyl are propyl, isopropyl, n-butyl, sec. butyl, tert. butyl, n-hexyl, cyclopentyl, cyclohexyl.

Aryl is phenyl, naphyl, anthryl or phenantryl. Arylalkyl ist e.g. benzyl. Heteroarylalkyl is understood as heteroaryl groups connected, as substituents, via a lower alkylene to a heteroaromatic ring selected from imidazolyl, pyridyl, thienyl, furyl, thiazolyl, indolyl, chinolinyl, pyrazolyl, pyrazyl, pyridazyl, pyrimidinyl.

A specific example is:

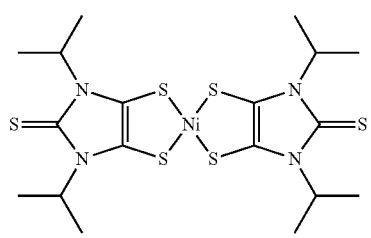

The amount of dithiolen metal complex to tungsten oxide usually is in the range 5 to 90 wt %.

In a further embodiment the invention relates to the use of a blend comprising tungsten oxide and/or tungstate as defined above and in addition at least one organic IR absorber selected from quinone-diimmonium salt, aminium salt, polymethines such as cyanine squaraine, croconaine; phthalocyanine, naphthalocyanine and quaterrylene-bisimide or in addition at least one anorganic IR absorber selected from lanthane hexaboride, indium tin oxide (ITO) antimony tin oxide such as Minatec 230 A-IR available from Merck, or Lazerflair® pigments available from Merck.

Further examples of organic IR absorbers are alkylated triphenyl phosphorothionates, for example as sold under the trade name Ciba® Irgalube® 211 or Carbon Black, for example as sold under the trade names Ciba® Microsol® Black 2B or Ciba® Microsol® Black C-E2. Examples of inorganic IR absorbers are oxides, hydroxides, sulfides, sulfates and phosphates of metals such as copper, bismuth, iron, nickel, tin, zinc, manganese, zirconium, tungsten, lanthanum, and antimony, including antimony(V) oxide doped mica and tin(IV) oxide doped mica.

The following examples describe certain embodiments of this invention, but the invention is not limited thereto. It should be understood that numerous changes to the disclosed embodiments could be made in accordance with the disclosure herein without departing from the spirit or scope of the invention. These examples are therefore not meant to limit the scope of the invention. Rather, the scope of the invention is to be determined only by the appended claims and their equivalents. In these examples all parts and percentages given are by weight, and the temperatures are given in degree Celsius, unless otherwise indicated. Abbreviations used:
NIR Near Infra Red radiation
NIR-A Near Infra Red Absorber
SEM Scanning Electron Microscopy Ammonium tungstate used in the examples is ammonium paratungstate $[(NH_4)_{10}W_{12}H_2O_{42}\cdot 4H_2O$; Osram Sylvania].

EXAMPLE 1 a) Preparation of Cesium Tungsten Bronzes Using a Plasma Reactor

Cesium carbonate and ammonium tungstate powders are mixed together in a desired molar ratio such as 1W to 0.2Cs (sample 1.2), 1W to 0.33Cs (sample 1.3), 1W to 0.5Cs (sample 1.4), 1W to 0.3Cs (sample 1.5), or 1W to 0.1Cs (sample 1.6). The powder mixture is homogenized then entrained into an argon carrier gas by a standard powder feeder. The sheath gas is comprised of a hydrogen/helium/argon gas mixture. The fluidized powder mixture is fed into a plasma reactor. The temperature range typically reached in the plasma hot zone of the reactor is between 5000-10,000 K. The reactant vapor is cooled by a quench gas and the resulting powder is collected in a bag filter. The resulting powders are analyzed by powder X-ray diffraction, electron microscopy, and UV-vis-NIR spectroscopy.

b) X-Ray Characterization

The samples are gently packed into 1.0 mm deep sample holders to avoid preferred orientation. Some of them are additionally prepared from suspension in isopropyl alcohol deposited onto low-background Si-plates. Due to the high linear absorption of x-rays from tungsten bronzes they all have μ of approx 1000 cm-1, which means that the depth of penetration is only 1-4 micrometer. Thus, even thin films of these materials may be considered as sufficiently thick for an optimal diffraction and reliable quantitative results.

The samples are run on a standard Bragg-Brentano Siemens D5000 Diffractometer system. A high-power, line-focus Cu-target is used operating at 50 kV/35 mA. The data are collected on a step scan mode with step size 0.02° 2-theta and counting time of 2.5 seconds per step. The data processing is done by Diffrac Plus® software Eva® v. 8.0. The primary phase identification is performed using Search Match® and PDF-2 reference database. The missing reference patterns are simulated and stored as reference from the single crystal structural data selected from ICS database. The profile fitting and Rietveld analyses are carried out by Bruker's AXS Topas® profile fitting software v. 2.1. Characteristic structural and microstructural data for the samples calculated from Rietveld analysis are listed in Table 1 below; phases identified by formula are characterized by their concentration in the powder mixture ($C_x$, % b.w.), lattice data (space group SG), approximate domain size (nm) and disorder parameter ($e_0$).

TABLE 1

Rietveld quantitative analysis of Cesium Tungsten Bronze mixtures

| Sample | Phases | SG | $C_x$ % | Size (nm) | $e_0$ |
|---|---|---|---|---|---|
| 1.2 | $Cs_{0.29}WO_3$ | P63 22 | 62 | 65 | 0.031 |
|  | $WO_3$ | P-1 | 36 | 38 | 0.37 |
|  | W | Im-3m | 2 | 120 | 0.08 |
| 1.5 | $Cs_{0.29}WO_3$ | P63 22 | 44 | 88 | 0.061 |
|  | $Cs_{0.32}WO_3$ | P63/mcm | 36 | 29 | 0.121 |
|  | $CsWO_3$ | Fd-3m | 8 | 74 | 0.221 |
|  | $WO_3$ | P-1 | 10 | 22 | 0.0 |
|  | W | Im-3m | 2 | 71 | 0.0 |
| 1.4 | $Cs_{0.29}WO_3$ | P63 22 | 45 | 88 | 0.048 |
|  | $CsWO_3$ | Fd-3m | 25 | 183 | 0.101 |
|  | $Cs_6W_{11}O_{36}$ | R-3c | 12 | 18 | 0.0 |
|  | $Cs_{8.5}W_{15}O_{48}$ | R-3m | 7 | 30 | 0.0 |
|  | WO3 | P-1 | 8 | 20 | 0.225 |
|  | W | Im-3m | 2 | 64 | 0.0 |
| 1.6 | $CsWO_3$ | Pm-3m | 31 | 152 | 0.12 |
|  | $Cs_{0.29}WO_3$ | P63 22 | 27 | 81 | 0.086 |
|  | $W_{18}O_{49}$ | P2/m | 20 | >2000 | 0.154 |
|  | $WO_3$ | P-1 | 18 | 28 | 0.225 |
|  | W | Im-3m | 3 | 83 | 0.0 |

Note:
Other possible cesium precursors (to be used instead of, or in admixtion to, cesium carbonate) include cesium acetate, citrate, formate, nitrate, hydrogencarbonate, nitrite.

EXAMPLE 2 a) Preparation

Potassium carbonate or sodium carbonate powder is mixed with ammonium tungstate powder in a desired molar ratio such as 1 W to 5 K (sample 2.1), 1 W to 0.33 K (sample 2.2), 1W to 0.5 Na (sample 2.3), 1 W to 0.33 Na (sample 2.4), 1 W to 0.165 Na (sample 2.5), 1 W to 1 Na (sample 2.6). Large excess of the potassium educt is used in the preparation of sample 2.1 due to poor evaporation of $K_2CO_3$.

The powder mixture is homogenized then entrained into an argon carrier gas by a standard powder feeder. The sheath gas is comprised of a hydrogen/helium/argon gas mixture. The fluidized powder mixture is fed into a plasma reactor. The temperature range typically reached in the plasma hot zone of the reactor is between 5000-10,000 K. The reactant vapor is cooled by a quench gas and the resulting powder was collected in a bag filter. The resulting powders are analyzed by powder X-ray diffraction, electron microscopy, and UV-vis-NIR spectroscopy.

Note: Other possible alkali precursors (to be used instead of, or in admixtion to, potassium carbonate or sodium carbonate) include potassium or sodium acetate, citrate, formate, nitrate, hydrogencarbonate, nitrite.

b) X-ray characterization with Rietveld analysis is carried out according to the method descrobed in Example 1b. Results are listed in Table 2 below; phases identified by formula are characterized by their concentration in the powder mixture ($C_x$, % b.w.), lattice data (space group SG), approximate domain size (nm) and disorder parameter ($e_0$).

TABLE 2

Rietveld quantitative analysis of Sodium
or Potassium Tungsten Bronze mixtures

| Sample ID | Components | SG | $C_X$, % wt. | Size $L_v$ (nm) | Disorder, $e_0$ |
|---|---|---|---|---|---|
| 2.1 | $K_{0.26}WO_3$ | P 6₃ 22 | 76.8 | | |
| | $WO_3$ | P21n | 17.9 | | |
| | $WO_2$ | P21c | 1.3 | | |
| | W | Im-3m | 4.0 | | |
| 2.3 | NaWO3 | Pm-3m | 36.8 | 373 | 0.20 |
| | NaWO3 | P4/mbm | 13.5 | 29 | 0.08 |
| | WO3 | P-1 | 39.9 | 14 | 0.08 |
| | W | Im-3m | 9.8 | 68 | 0.0 |
| 2.5 | NaWO3 | Pm-3m | 53.7 | 18 | 0.32 |
| | NaWO3 | P4/mbm | 8.7 | 24 | 0.05 |
| | WO3 | P-1 | 29.7 | 24 | 0.08 |
| | W | Im-3m | 7.9 | 56 | 0.0 |
| 2.6 | NaWO3 | Pm-3m | 30.8 | 198 | 0.23 |
| | WO3 | P-1 | 50.7 | 25 | 0.20 |
| | W | Im-3m | 18.5 | 66 | 0.0 |
| 2.4 | NaWO3 | Pm-3m | 62.5 | 72 | 0.14 |
| | NaWO3 | P4/mbm | 6.2 | 24 | 0.05 |
| | WO3 | P-1 | 29.6 | 18 | 0.04 |
| | W | Im-3m | 1.6 | 41 | 0.0 |

Samples nearly identical to sample 2.1 are obtained using use tri-potassium citrate monohydrate (K3C6HSO7.H2O) at a molar ratio 2 K to 1 W, or potassium acetate (CH3CO2K) at a molar ratio 0.5 K to 1 W (instead of potassium carbonate at the molar ratio 1 W to 5 K).

EXAMPLE 3.1

Application Example NIR Curing

The different NIR-Absorbers were tested in a 2P-PU Formulation concerning there temperature uptake during NIR-Curing as well as the final coating properties.

The NIR-Absorbers were incorporated into the millbase using glassbeads and a scandex shaker for 16 h according to the following table (values are in g).

| Millbase | |
|---|---|
| Laropal A 81 (urea-aldehyde resin available from BASF) 60% in 1-methoxy-2propylacetate/xylene 3:1 | 15.7 g |
| EFKA 4401 (polymeric dispersant, available from Ciba Inc) | 0.08 g |
| 1-methoxy-2propylacetate (solvent) | 4.62 g |
| Butylglycolacetate (solvent) | 1.16 g |
| NIR-A | 0.19 g |

The millbase was mixed with the letdown formulation and the crosslinker was added according to the following table.

| LET DOWN | |
|---|---|
| Millbase | 21.75 |
| 2p PUR Clearcoat* | 3.84 |
| MPA/BGA (95/5) | 7.61 |
| Amount (g) | 33.20 |
| Desmodur N 3390 (90%) | 7.50 |

Desmodur N3390 is an aliphatic isocyanate available from Bayer Material Science and used as crosslinker

| * 2p PUR Clearcoat: | |
|---|---|
| Macrynal SM 510n | 78.7 |
| EFKA ® 3030 | 0.15 |
| TINUVIN 292/TINUVIN 99-2 (65/35) | 2 |
| DBTL (10% in xylene) | 0.1 |
| DABCO-33LV (10% in xylene) | 0.1 |
| 1-methoxy-2-propylacetate | 14.45 |
| Butylglycolacetate | 4.5 |
| Sum | 100 |

Macrynal SM 510n is a hydroxyfunctional acrylic resin available from Cytec Surface Specialties EFKA 3030 is a modified polysiloxane to improve levelling available from Ciba Specialty Chemicals DBTL is Dibutyltin dilaurate and used as a catalyst DABCO-33LV is a mixture of triethylenediamine and dipropyleneglycol available from Air Products & Chemicals and used as catalyst The coating was applied by a wire bar using a WFT (wet film thickness) of 80 μm. The coatings were dried in an NIR-dryer using different lamp settings (6 Adphos high-burn NIR-lamps, output from 50-100%) and belt speeds (1-4 m/min).

The distribution of the NIR-A into the coating formulation was checked via the measurement of haze over black. The lower the value the better the distribution in the formulation and the less impact on the visual film properties is observed.

| NIR Absorber | WFT (mm) | Wt % on solids | Haze |
|---|---|---|---|
| Example 1.2 | 80 | 1 | 9.3 |
| Example 1.3 | 80 | 1 | 8.4 |
| LaB₆ | 80 | 1 | 14.3 |
| Minatec 230 A-IR | 80 | 1 | 10.4 |
| Lazerflair 825 | 80 | 1 | 15.7 |

The temperature of the coating surface was measured directly after cure.

The Table below shows the results using a belt speed of 2 m/min, a 6 Adphos high-burn NIR-lamps, output 70%, a distance to the lamp of 100 mm

| NIR absorber | Wt % on solid | Absorption integral 100% ref. FW200 | Temp. after Curing (° C.) |
|---|---|---|---|
| Blanc (no NIR absorber) | — | 0 | 98 |
| Minatec 230 A-IR | 1 | 0.5 | 106 |
| Lazerflair 825 | 1 | n.d. | 112 |
| Lumogen IR 765 | 1 | 6 | 129 |
| Lumogen IR 788 | 1 | 12 | 129 |

-continued

| NIR absorber | Wt % on solid | Absorption integral 100% ref. FW200 | Temp. after Curing (° C.) |
|---|---|---|---|
| (Ni complex structure) | 1 | 31 | 180 |
| LaB$_6$ | 1 | 2.5 | 151 |
| Cs$_{0.2}$WO$_3$ (Example 1.2) | 1 | 4 | 184 |
| Cs$_{0.3}$WO$_3$ (Example 1.3) | 1 | 3 | 184 |
| FW 200 (Carbon black) | 1 | 100 | 232 |

The Table clearly shows that the present alkali metal tungsten bronzes are able to convert NIR radiation into heat to nearly the same extent as carbon black does, 184° C. compared to 232° C. Thus, the tungsten oxide material of the present invention comes quite close to the target of a "colourless carbon black". Even near infrared absorbers with a higher absorption integral in the NIR range (800-1500 nm) show a significantly lower temperature increase compared to the present tungstates.

This can be seen especially in an application with TiO2.

EXAMPLE 3.2

| Millbase | | Letdown | |
|---|---|---|---|
| Dynapol ® LH 530-02 (60%) | 35.00 | Millbase | 78.25 |
| Dowanol ® PM | 1.00 | Dynapol ® LH 530-02 (60%) | 10.82 |
| EFKA ® 5010 (50%) | 1.80 | Cymel ® 303 (98%) | 5.75 |
| EFKA ® 3772 (60%) | 1.00 | Solvent Naphta 150 | 0.88 |
| Aerosil ® 200 | 0.60 | Dowanol ® PM | 1.00 |
| Solvent Naphta 150 | 5.35 | Butylglycoleacetate | 1.10 |
| Estasol ®/DBE | 3.00 | Dynapol ® Kat. 1203 (50%) | 0.70 |
| 50% URAD ® DD 27/50 % Solvent Naphta 150 | 0.50 | Tinuvin ® 123 | 1.00 |
| NIR-A/pigments | 30.00 | Tinuvin ® 400-2 (85%) | 0.50 |

The millbase was prepared according to a standard process using a dispermat for pre-mixing and additional milling for 1 h using a Disperser DAS 200 from Lau. The coatings were applied onto pre-primed white aluminium panels using a slit coater leading to DFT's of around 80 μm. Formulations with TiO$_2$ and mixtures of TiO$_2$ and NIR-A's were tested. Curing was done at different belt speeds using 6 HB-NIR emitters from the company Adphos.

Especially in the field of coil coatings the main usage is in the field of "white" shades e.g. RAL 9001, 9003, 9010, 9016. RAL 9010 being the most critical concerning the efficient absorption of the emitted energy. To test the effect on curing speed by the addition of NIR-A (Example 1), a 45 w %/w TiO$_2$ pigmented system was used as reference. The NIR-A can be added either directly in the milling step or alternatively via a resin free pigment paste based on Ciba EFKA® 4310 for solvent based applications. The addition of the NIR-A leads to a strong reduction of the curing time. This allows to either increase the belt speed leading to a higher throughput of the coating line or to reduce the lamp output leading to a reduction of electricity costs.

EXAMPLE 3.3

The same formulation is used as in Example 3.2. The formulation with 45 w % TiO$_2$ on solids is used as reference.

| NIR Absorber | w % on solids | Belt speed to cure [m/min] | ΔE |
|---|---|---|---|
| none | 0 | 0.75 | 0 |
| Minatek 230 A-IR | 1 | 1.00 | 1.9 |
| Example 1.2 | 0.05 | 1.50 | 0.70 |
| Example 1.3 | 0.1 | 1.50 | 0.80 |

The belt speed to cure is determined via the stability of the cured coating against 100 MEK doublerubs.

EXAMPLE 4

Laser Welding

The IR absorber according to example 1 is incorporated by means of an injection molding machine into a polycarbonate sheet. (thickness 2 mm) at a concentration of 500 ppm. The resulting transparent slightly bluish sheet is welded together with a polycarbonate sheet (thickness 1 mm) using a 250 watt Nd:YAG-laser. The surface is scanned by laser beam at a speed of 20 mm/sec.

The resulting welding has an excellent connection, is highly transparent, does not show any localized plastic deformation, does not evolve bubbles during welding. No fracture of the joining line is induced due to mechanical stress.

With state of the art IR absorbers for laser welding of plastics like Lumogen IR 765 or Lumogen IR 788 no welding takes place under these conditions. This is also true for diode lasers at e.g. 980 nm, 940 nm or 850 nm instead of a Nd:YAG laser (1064 nm). Only at 808 nm welding with these IR absorbers takes place.

EXAMPLE 5

Heat Shielding

Sample evaluation: Samples containing solar control additives are evaluated using equipment as shown in FIG. 1 of WO 09059901. This instrument compares the temperature build up of a black aluminum panel behind two plastic samples (A4 size), one sample containing the solar controlling additive the other being a reference without any solar controlling additive. The two samples are mounted on the front side of two different chambers that are exposed to light of a 500 W halogen lamp with color temperature of 5000 K. temperature is recorded by thermocouples (PT100) in each chamber, connected to a PC data logger.

The resulting heat shielding factor (HS) after 800 seconds, expressed as $\Delta T_{800\ sec}$ (° C.), is reported in the tables below.

5.1 PET-G Film Extrusion

Polyethylene terephthalate powder (PET-G; Eastar 6763 from Eastman) and 1% Tinuvin 1577 are turbo-mixed with the additives in loading as described in the table below, dried at 70° C. for 12 hours, then compounded in a twin screw Collin Extruder. The obtained pellets are dried again and extruded in a Collin cast line to get a 300 micron PET-G film. Samples of the invention show low haze 6.6 or 7.7% haze for 0.125%, 11.1 or 13.3% for 0.25% additive loading). The heat shielding effect obtained using the films is determined as described above; results are compiled in the below table.

TABLE

| Sample ID | Conc. [%] | $\Delta T_{800\,sec}$ (° C.) |
|---|---|---|
| 2.2 | 0.125 | 2.06 |
| 2.2 | 0.250 | 3.64 |
| 2.4 | 0.125 | 2.48 |
| 2.4 | 0.250 | 4.00 |
| Reference | 0 | |

The present PET compositions show a good heat shielding effect.

An alternative procedure can be used for film preparation and screening.

5.2. PET-G Film Preparation

The polyethylene terephtalate powder (PET-G; Eastar 6763 from Eastman) is dried in a vacuum oven for eight hours at 65° C., turbo-mixed with the IR absorbers at loading of 2 wt. % and compounded in a Berstorff twin screw extruder. The resulting master batch pellets are grinded to powder and dried again at 65° C. in a vacuum oven for eight hours. Appropriate amounts of the IR absorber masterbatch and 1% UV absorber (TINUVIN 1577 from Ciba) are added to dried polyethylene terephthalate powder to obtain formulations with IR absorber in a concentration ranging from 0.05 wt. to 0.125 wt %. The formulations are mixed in a turbo mixer and compounded in a Berstorff twin-screw extruder. The resulting pellets are then extruded in a Collin cast line equipped with a flat die. In this way PET-G films are produced with a width of 10 cm and a thickness of 300 micron. For all processing steps a temperature of 260° C. is used.

Heat Shielding Evaluation through Spectroscopic Method

The method uses the ASTM G173-03 standard spectral solar irradiance and spectroscopic measurements of two films of the same thickness, one with an IR absorber at known concentration and the other without IR absorber.

The spectral solar irradiance expresses the percentage solar energy at every single wavelength. The integration of the curve gives the total solar irradiance of 1000 Watts, which can be separated into 62 Watts for the UV, 549 Watt for the Visible and 389 Watts for the IR domain.

The transmitted spectral energy of the solar irradiation through the two films is easily derived from the transmission spectra of the two films.

The integration of the curves representing the transmitted spectral energy through the two films enables again a separation into UV, Visible and IR domains. For an application using PET glazing the best IR absorber is the one allowing a maximum reduction of the IR energy (highest possible B value) with a minimum shading in the visible domain (lowest possible A value).

Results showing the varying B/A ratio using present IR absorbers of samples 2.4, 7.1, 7.2 and 7.3 in loadings of 0.05, 0.10 and 0.125% b.w., respectively, are shown in FIG. 1. FIG. 2 shows the results for transparency, haze and clarity determined for the same PET film samples.

5.3 PVB Films Preparation:

66% of PVB powder (Butvar® B-72 A from Solutia) and 33% of the liquid plasticizer Solusolv® S-2075 are mixed. An appropriate amount of the resulting mixture (still a powder) is weighted and introduced into the Brabender® PL 2000 at 90° C., the additive (sample 7.1, 7.2 or 7.3 as explained further below; loading 0.05% or 0.1% by total weight) is immediately added and blended for 6-10 min. The resulting mass is then compression molded to 70×50×1 mm plaques for 3 min at 90° C. The films obtained are homogeneous. A sample containing no IR absorbing additive is prepared as a reference.

Spectroscopic evaluation of the heat shielding effect is carried out as described under 5.2. Delta E of films containing 0.05% b.w. of the additive, compared with the reference, is shown in FIG. 3.

5.4 LDPE Films Preparation:

LDPE powder (FF29 from Polimeri Europa) and 0.8% Tinuvin 371 are turbo-mixed with an IR-absorbing additive listed in Table 2 in loading from 0.05% to 0.25%, and then compounded in a twin screw Collin Extruder to prepare Compound 1.

150-micron LDPE films are prepared by melt blow extrusion of the Compound 1 using a FORMAC lab extruder.

All films show good transparency thanks to the good dispersability of the present nanopowders.

EXAMPLE 6

Laser Marking of Paper

An acrylic varnish is prepared by mixing together 20 parts of Vinnapas® C501 resin (available from Wacker, a solid copolymer of vinyl acetate and crotonic acid) and 80 parts of propyl acetate.

A colourless ink formulation composed of 45 parts of Ti-oxide AH-R (anatase), 54.9 parts of the above varnish and 0.1 parts of the sodium tungsten bronze material prepared according to example 2 (composed of 59.5 parts sodium tungsten bronze, 30.6 parts tungsten-trioxide and 9.9% tungsten) is applied to clay coated paper using a a bar coater.

Laser marking with a Nd:YAG laser at various powers (14-25 A, 20 kHz, 1500 mms, 4.2-7.6 W) gives excellent marking results with high contrast.

COMPARATIVE EXAMPLE

Using lanthanum hexaboride instead requires more than 15 times as much of the IR-absorber (1.6 parts LaB6) in order to get the same laser marking performance.

EXAMPLE 7 a) Preparation

Cesium acetate powder is mixed with ammonium tungstate powder in a desired molar ratio 0.20 Cs to 1 W (sample 7.1), 0.25 Cs to 1 W (sample 7.2), 0.30 Cs to 1 W (sample 7.3). The powder mixture is homogenized then entrained into an argon carrier gas by a standard powder feeder. The sheath gas is comprised of a hydrogen/helium/argon gas mixture. The fluidized powder mixture is fed into a plasma reactor. The temperature range typically reached in the plasma hot zone of the reactor is between 5000-10,000 K. The reactant vapor is cooled by a quench gas and the resulting powder was collected in a bag filter. The resulting powders are analyzed by powder X-ray diffraction, electron microscopy, and UV-vis-NIR spectroscopy.

b) X-ray characterization with Rietveld analysis is carried out according to the method described in Example 1b. Results are listed in Table 7 below; phases identified by formula are characterized by their concentration in the powder mixture ($C_x$, % b.w.), lattice data (space group SG), approximate domain size (nm) and disorder parameter ($e_0$).

TABLE 7

Rietveld quantitative analysis of Cesium Tungsten Bronze mixtures

| Sample ID | Phases | SG | $C_x$, % wt. | Size (nm) | $e_0$ |
|---|---|---|---|---|---|
| 7.3 5 phases | $Cs_{0.3}WO_3$ | $P6_322$ | 88.1 | 43 | 0.08 |
| | W | Im-3m | 6.6 | 33 | 0.0 |
| | $Cs_{0.5}WO_3$ | Fm-3m | 2.9 | 42 | 0.20 |
| | $WO_2$ | $P2_1/c$ | 1.5 | 85 | 0.05 |
| | $WO_3$ | P-1 | 1.0 | | |
| 7.1 4 phases | $Cs_{0.3}WO_3$ | $P6_322$ | 90.1 | 34 | 0.03 |
| | W | Im-3m | 5.3 | 34 | 0.0 |
| | $WO_2$ | $P2_1/c$ | 3.6 | 44 | 0.05 |
| | $WO_3$ | P-1 | 1.0 | | |
| 7.2 4 phases | $Cs_{0.3}WO_3$ | $P6_322$ | 92.0 | 46 | 0.03 |
| | W | Im-3m | 5.0 | 31 | 0.0 |
| | $WO_2$ | $P2_1/c$ | 2.4 | 43 | 0.0 |
| | $WO_3$ | P-1 | 1.0 | | |

Figure 1:
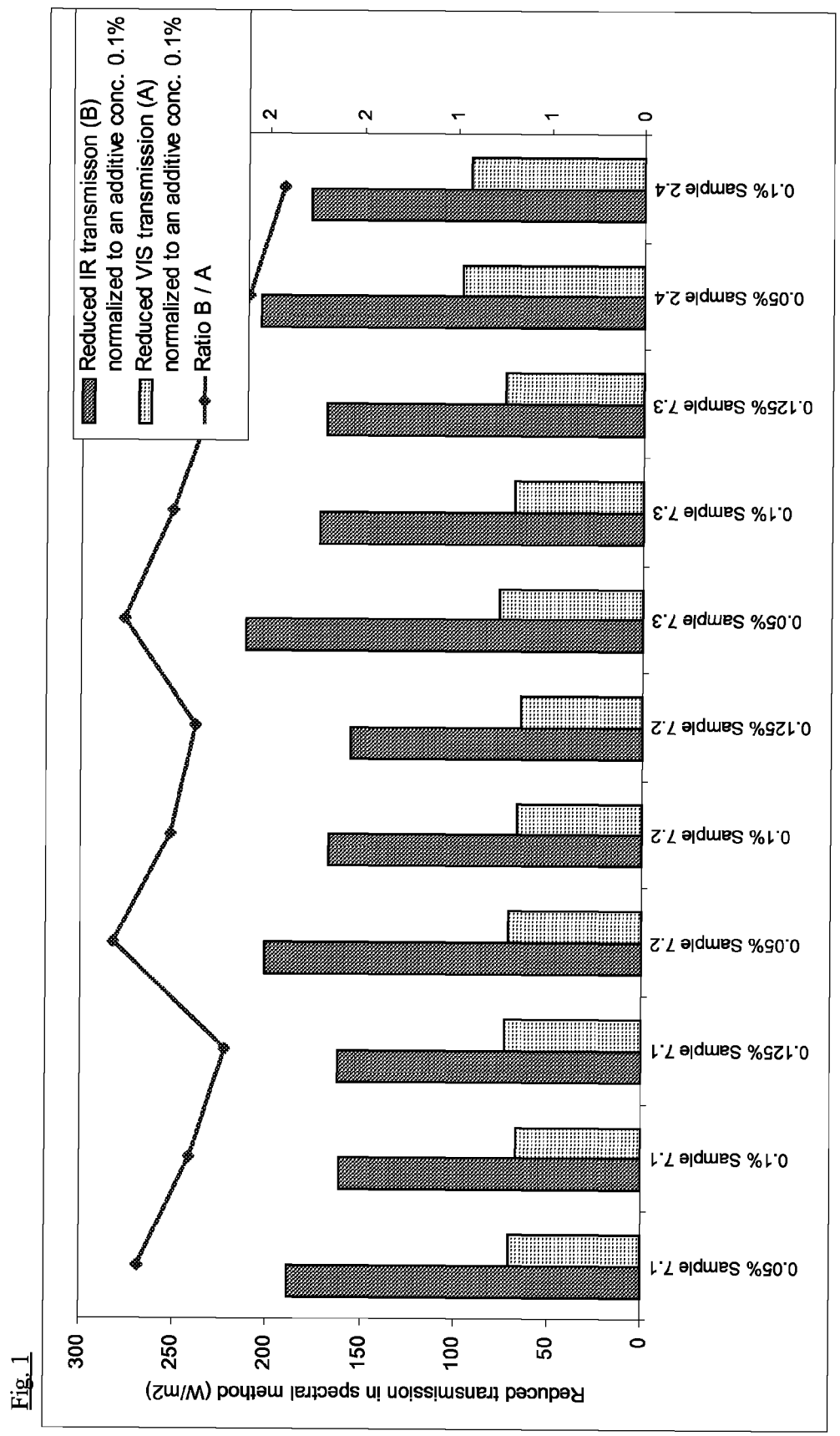
FIG. 1 shows the results obtained for the reduction of IR transmission (B) and the reduction of transmitted visible light (A) for PET films of example 5.2.
Figure 2:
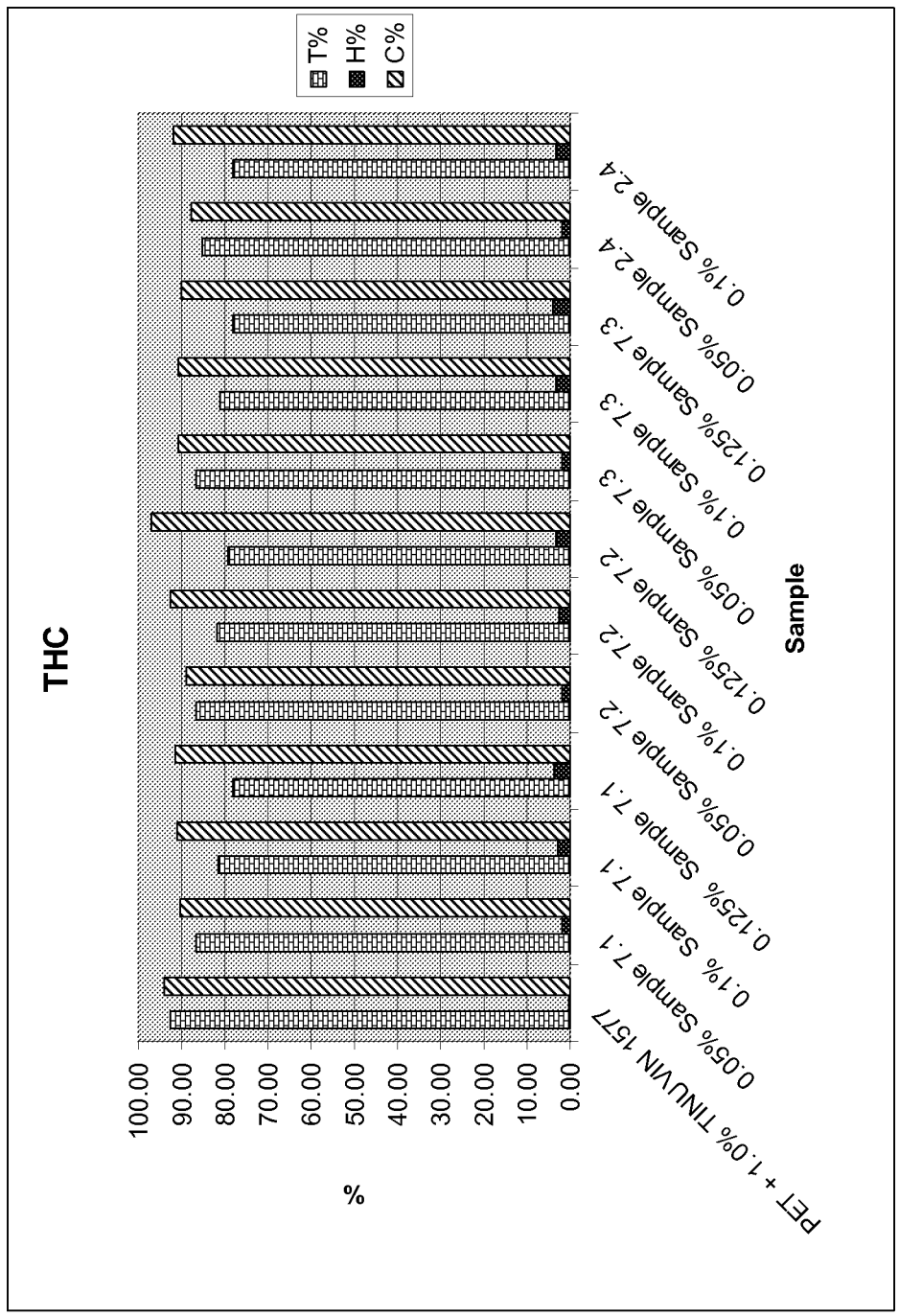
FIG. 2 shows the results for transparency (T), haze (H) and clarity (C) determined for the PET films of example 5.2.
Figure 3:
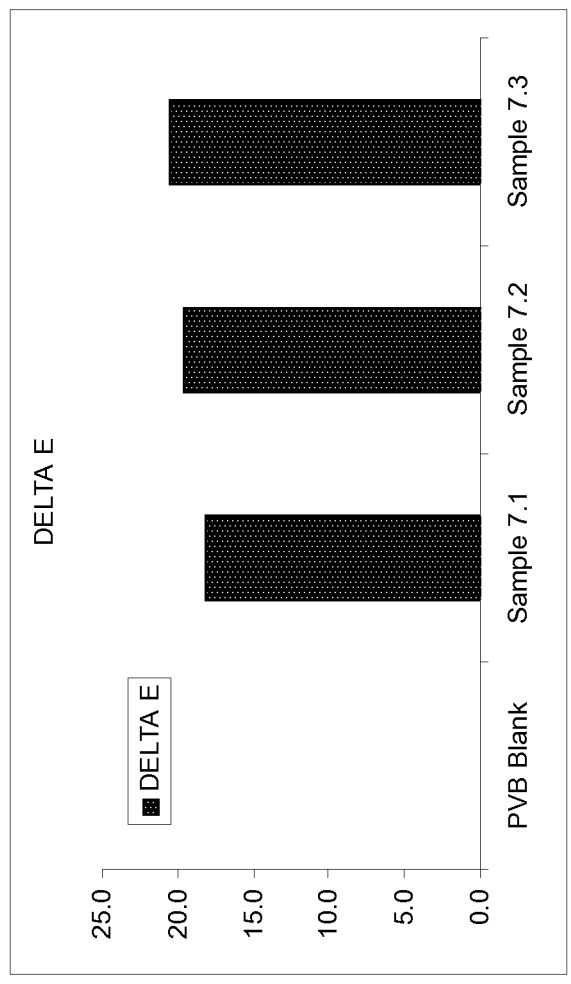
FIG. 3 shows Delta E of PVB films (example 5.3) containing 0.05% b.w. of Cesium Tungsten Bronze particles as of example 7.

The invention claimed is:

1. Powder composition comprising:
(a) an alkali metal tungsten bronze;
(b) a binary tungsten oxide; and
(c) tungsten metal;
wherein the composition comprises
25-95 parts by weight of the alkali metal tungsten bronze of the formula $WO_{3-z}Me_x$, where Me is selected from Cs, Na and K, x ranges from 0.2 to 1, and z ranges from 0 to x;
4-60 parts by weight of the binary tungsten oxide; and
1-15 parts by weight of tungsten metal.

2. Powder composition comprising:
(a) an alkali metal tungsten bronze;
(b) a binary tungsten oxide; and
(c) tungsten metal;
wherein the composition comprises on 100 parts by weight of the total powder composition,
70-98 parts by weight of the alkali metal tungsten bronze of the formula $WO_{3-z}Me_x$, where Me is selected from Cs, Na and K; x ranges from 0.2 to 1, and z ranges from 0 to x;
1-15 parts by weight of the binary tungsten oxide; and
1-15 parts by weight of tungsten metal.

3. The composition of claim 1 or 2 wherein components (a)-(c) make up 95-100% by weight of the total powder composition, the remainders, if any, being organic polymers, other tungsten compounds and/or water.

4. The composition of claim 1 or 2, wherein the alkali metal tungsten bronze is an alkali metal tungsten bronze or alkali metal tungsten bronze composition prepared by a process comprising contacting a mixture of an ammonium tungstate and a suitable salt selected from lithium, sodium, potassium, rubidium and cesium acetates, citrates, formates, nitrates, hydrogencarbonates, nitrites, chlorides, bromides, iodides, sulfates, perchlorates, hypochlorite, hydroxides, propionates, pyruvates, oxalates, fumarates, lactates, methoxides, alkoxides or oxides; and/or a suitable alkali metal tungstate; with a reducing gas at a temperature of 2500 K or more.

5. The composition of claim 4, wherein the contact is effected in a plasma.

6. The composition of claim 4, wherein the reducing gas is used in mixture with a noble gas.

7. The composition of claim 4, wherein the reducing gas comprises hydrogen and the amount of hydrogen is adjusted to keep the amount of tungsten metal formed in the product below 15% by weight of the product.

8. Particle dispersion comprising a powder composition according to claim 1 or 2 and a dispersing medium selected from organic polymers, solvents and combinations of organic polymers and solvents.

9. Particle dispersion of claim 8, wherein 90% by weight or more of the total particle mass are particles from the size range 1 nm to 800 nm.

10. Composition comprising:
ii) a synthetic thermoplastic organic polymer; and
(ii) 0.01 to 15% by weight, based on component (i), of a powder composition according to claim 1 or 2.

11. Composition of claim 10 containing component (ii) in the form of particles dispersed in the matrix of component (i).

12. Method to increase the heat-input amount of near infrared radiation into a solid or liquid material, which method comprises incorporation of a composition according to claim 1 into said material, which material is selected from plastics, coating compositions, adhesives, inks, toners and paper, for the laser welding of plastics, NIR curing and drying of coatings, curing and drying of adhesives, drying of printing inks, fixing of ink toners to a substrate, heating of plastic performs or laser marking of plastics or paper.

13. Method of claim 12, further comprising the incorporation of $TiO_2$ a quinone-diimmonium salt, an aminium salt, polymethines, phthalocyanine, naphthalocyanine, quaterrylene-bisimide lanthanum hexaboride, indium tin oxide, antimony tin oxide pigments or dithiolen metal complexes of the formula I or II

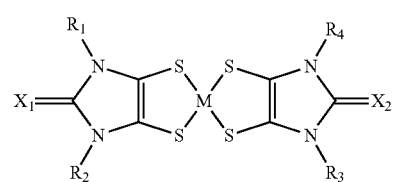

I

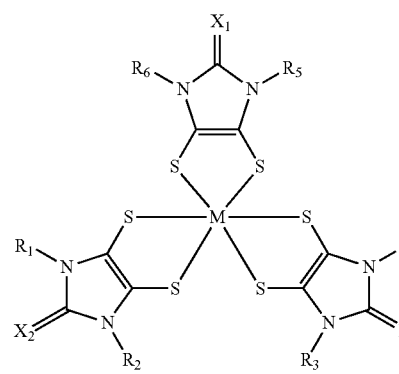

II wherein

M is Ni, Pd, Pt, Au, Ir, Fe, Zn, W, Cu, Mo, In, Mn, Co, Mg, V, Cr or Ti, $X_1$, $X_2$ and $X_3$ independently of one another are sulfur or oxygen and $R_1$, $R_2$, $R_3$, $R_4$, $R_5$ and $R_6$ independently of one another are hydrogen,
  $NR_7R_8$, $C_1$-$C_{18}$alkyl, aryl, aralkyl or heteroarylalkyl, wherein $R_7$ and $R_8$ independently of one another are $C_1$-$C_{18}$alkyl, aryl, aralkyl or heteroarylalkyl.

14. Method to increase the heat-input amount of near infrared radiation into a solid or liquid material, which method comprises incorporation of a composition according to claim 2 into said material, which material is selected from plastics, coating compositions, adhesives, inks, toners and paper, for the laser welding of plastics, NIR curing and drying of coatings, curing and drying of adhesives, drying of printing inks, fixing of ink toners to a substrate, heating of plastic performs or laser marking of plastics or paper.

15. Method of claim 14, further comprising the incorporation of $TiO_2$, a quinone-diimmonium salt, an aminium salt, polymethines, phthalocyanine, naphthalocyanine, quaterrylene-bisimide lanthanum hexaboride, indium tin oxide, antimony tin oxide, pigments or dithiolen metal complexes of the formula I or II

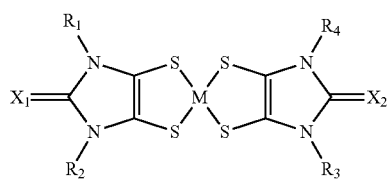

I

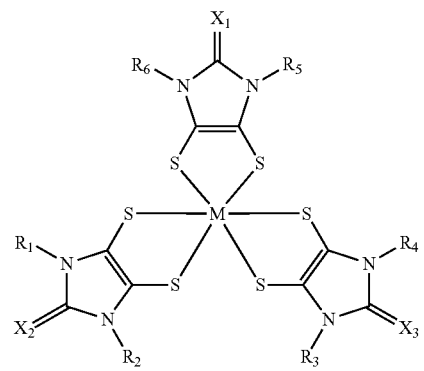

II wherein

M is Ni, Pd, Pt, Au, Ir, Fe, Zn, W, Cu, Mo, In, Mn, Co, Mg, V, Cr or Ti, $X_1$, $X_2$ and $X_3$ independently of one another are sulfur or oxygen and $R_1$, $R_2$, $R_3$, $R_4$, $R_5$ and $R_6$ independently of one another are hydrogen, $NR_7R_8$, $C_1$-$C_{18}$alkyl, aryl, aralkyl or heteroarylalkyl, wherein $R_7$ and $R_8$ independently of one another are $C_1$-$C_{18}$alkyl, aryl, aralkyl or heteroarylalkyl.

* * * * *